United States Patent
Ying et al.

(10) Patent No.: US 10,965,407 B2
(45) Date of Patent: Mar. 30, 2021

(54) USER EQUIPMENTS, BASE STATIONS AND COMMUNICATION METHODS

(71) Applicants: Sharp Kabushiki Kaisha, Sakai (JP); FG Innovation Company Limited, Hong Kong (CN)

(72) Inventors: Kai Ying, Vancouver, WA (US); Tatsushi Aiba, Vancouver, WA (US); Toshizo Nogami, Vancouver, WA (US); John Michael Kowalski, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 15/886,389

(22) Filed: Feb. 1, 2018

(65) Prior Publication Data

US 2018/0219649 A1 Aug. 2, 2018

Related U.S. Application Data

(63) Continuation of application No. PCT/US2018/016168, filed on Jan. 31, 2018.
(Continued)

(51) Int. Cl.
*H04L 1/18* (2006.01)
*H04W 76/27* (2018.01)
(Continued)

(52) U.S. Cl.
CPC .......... *H04L 1/1816* (2013.01); *H04L 1/0643* (2013.01); *H04L 1/08* (2013.01);
(Continued)

(58) Field of Classification Search
CPC . H04W 36/12; H04W 36/0055; H04W 36/30; H04W 36/38; H04W 40/36; H04W 40/12
See application file for complete search history.

(56) References Cited

U.S. PATENT DOCUMENTS

| 2012/0113831 | A1* | 5/2012 | Pelletier | H04L 5/0053 370/252 |
|---|---|---|---|---|
| 2015/0181576 | A1* | 6/2015 | Papasakellariou | H04L 5/0053 370/329 |

(Continued)

FOREIGN PATENT DOCUMENTS

| EP | 2922225 A1 | 9/2015 |
|---|---|---|
| WO | 2016119229 A1 | 8/2016 |
| WO | 20160165653 A1 | 10/2016 |

OTHER PUBLICATIONS

International Search Report and Written Opinion issued for PCT Application No. PCT/US2018/016168 dated May 2, 2018.
(Continued)

*Primary Examiner* — Christopher M Crutchfield
*Assistant Examiner* — Tito Q Pham
(74) *Attorney, Agent, or Firm* — Austin Rapp

(57) ABSTRACT

A user equipment (UE) is described. The UE receives, from a base station apparatus, a radio resource control message including first information used for configuring a number of repetitions for transmission of a transport block. The UE also receives, from the base station apparatus, a radio resource control message including second information used for configuring a pattern of redundancy version for the repetitions for the transmission of the transport block. The pattern of the redundancy version is any one of a first pattern and a second pattern. The UE also performs, based on the first information and the second information, to the base station apparatus, the repetition for the transmission of the transport block. The same redundancy version used for the
(Continued)

Case-2 repetitions for the transmission for the transport block is a redundancy version "zero."

12 Claims, 29 Drawing Sheets

Related U.S. Application Data

(60) Provisional application No. 62/453,994, filed on Feb. 2, 2017.

(51) Int. Cl.
    *H04W 72/04*     (2009.01)
    *H04L 1/06*     (2006.01)
    *H04L 1/08*     (2006.01)
    *H04L 5/16*     (2006.01)
    *H04L 5/22*     (2006.01)
    *H04L 5/00*     (2006.01)
    *H04L 1/00*     (2006.01)

(52) U.S. Cl.
    CPC ......... *H04L 1/1819* (2013.01); *H04W 72/042* (2013.01); *H04W 76/27* (2018.02); *H04L 1/0003* (2013.01); *H04L 1/0009* (2013.01); *H04L 5/0048* (2013.01); *H04L 5/0051* (2013.01); *H04L 5/0053* (2013.01); *H04L 5/16* (2013.01); *H04L 5/22* (2013.01)

(56) References Cited

U.S. PATENT DOCUMENTS

| | | | | |
|---|---|---|---|---|
| 2017/0187494 | A1* | 6/2017 | Tirronen | H04L 1/1671 |
| 2017/0346607 | A1* | 11/2017 | Chen | H04L 1/1896 |
| 2018/0198677 | A1* | 7/2018 | Blankenship | H04L 41/0806 |
| 2018/0309544 | A1* | 10/2018 | Hwang | H04L 1/18 |
| 2018/0359745 | A1* | 12/2018 | Yeo | H04L 1/18 |

OTHER PUBLICATIONS

"RAN1 Chairman's Notes," 3GPP TSG RAN WG1 Meeting #86bis, Lisbon, Portugal Oct. 14, 2016.

3GPP TR 22.862 v1.0.0, "Feasibility Study on New Services and Markets Technology Enablers Critical Communications; Stage 1 (Release 14)," Feb 2016.

3GPP TS 36.321, V14.0.0, "Evolved Universal Terrestrial Radio Access (E-UTRA); Medium Access Control (MAC); Protocol specification (Release 14)", Sep. 2016.

3GPP TR 38.913 V0.3.0, "Study on Scenarios and Requirements for Next Generation Access Technologies (Release 14)," Mar. 2016.

3GPP TS 36331, V14.0.0, "Evolved Universal Terrestrial Radio Access (E-UTRA); Radio Resource Control (RRC); Protocol specification (Release 14)", Sep. 2016.

Huawei, HiSilicon, "Overview of URLLC support in NR", 3GPP TSG RAN WG1 Meeting #86bis, Lisbon, Portugal, R1-1608843, Oct. 14, 2016.

Huawei, HiSilicon, "Support of URLLC in UL", 3GPP TSG RAN WG1 NR Ad Hoc Meeting, Spokane, Washington, R1-1700024, Jan. 20, 2017.

Sony, "Feedbacks for URLLC transmission", 3GPP TSG RAN WG1 NR Ad Hoc Meeting, Spokane, USA, R1-1700681, Jan. 20, 2017.

* cited by examiner

USER EQUIPMENTS, BASE STATIONS AND COMMUNICATION METHODS

RELATED APPLICATIONS

This application is related to and claims priority from U.S. Provisional Patent Application No. 62/453,994, entitled "SIGNALING, PROCEDURES, USER EQUIPMENT AND BASE STATIONS FOR TRANSMISSION/RETRANSMISSION OF ULTRA-RELIABLE AND LOW LATENCY COMMUNICATIONS," filed on Feb. 2, 2017, which is hereby incorporated by reference herein, in its entirety.

TECHNICAL FIELD

The present disclosure relates generally to communication systems. More specifically, the present disclosure relates to new signaling, procedures, user equipment and base stations for transmission/retransmission of ultra-reliable and low latency communications.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
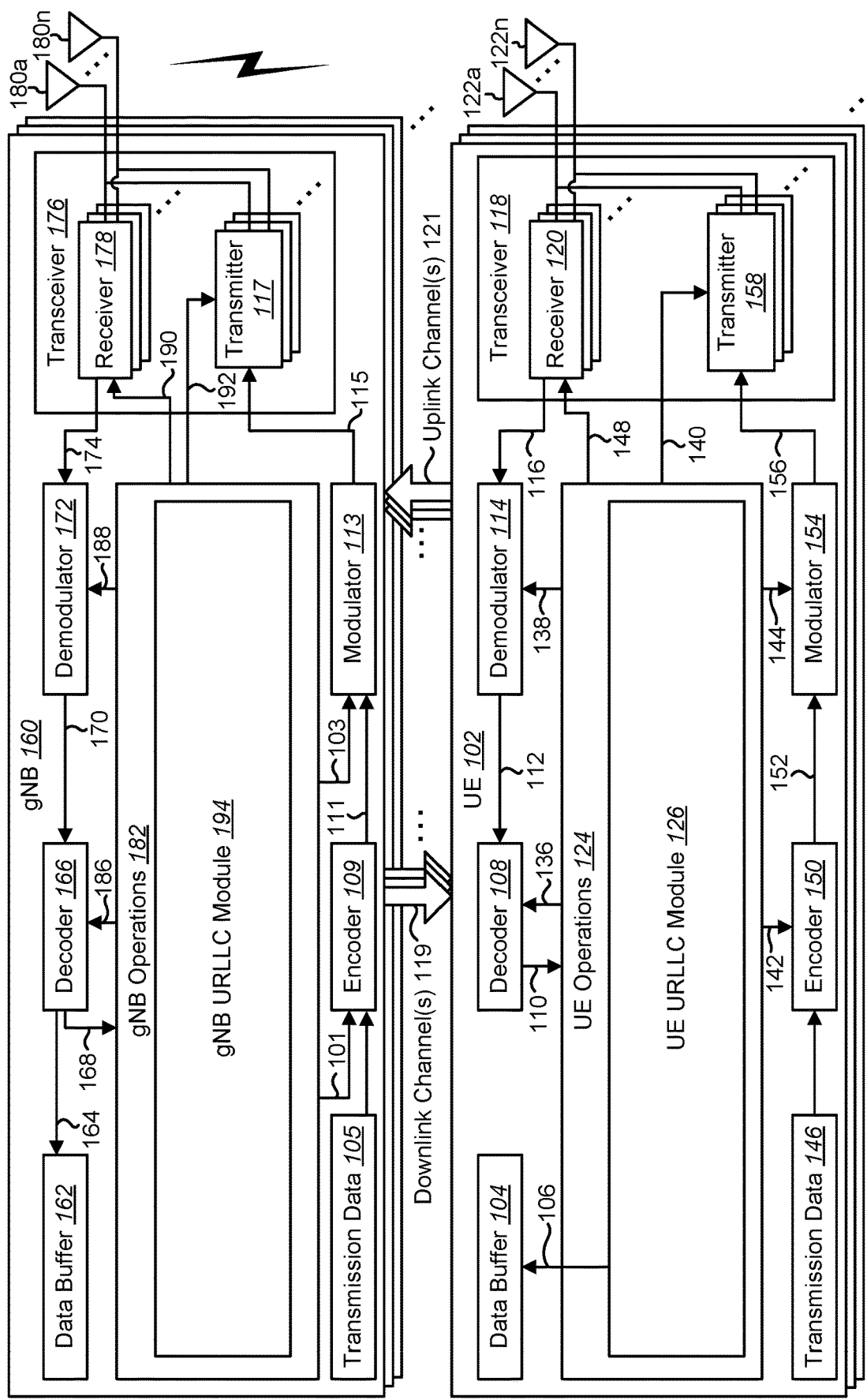
FIG. 1 is a block diagram illustrating one implementation of one or more base stations (gNBs) and one or more user equipments (UEs) in which systems and methods for ultra-reliable and low latency communication operations may be implemented.

A user equipment (UE) is described. The UE includes receiving circuitry configured to receive, from a base station apparatus, a radio resource control message including first information used for configuring a number of repetitions for transmission of a transport block. The receiving circuitry is also configured to receive, from the base station apparatus, a radio resource control message including second information used for configuring a pattern of redundancy version for the repetitions for the transmission of the transport block. The pattern of the redundancy version is any one of a first pattern and a second pattern. The first pattern is that different redundancy versions are used the repetitions for the transmission of the transport block. The second pattern is that a same redundancy version is used the repetitions for the transmission of the transport block. The UE also includes transmitting circuitry configured to perform, based on the first information and the second information, to the base station apparatus, the repetition for the transmission of the transport block. The same redundancy version used for the repetitions for the transmission for the transport block is a redundancy version "zero."

An initial transmission of the repetitions for the transmission for the transport block may be started at any position of resource. The initial transmission of the repetitions for the transmission for the transport block may be started at a specific position of resource.

A base station apparatus (gNB) is also described. The gNB includes transmitting circuitry configured to transmit, to a user equipment, a radio resource control message including first information used for configuring a number of repetitions for transmission of a transport block. The transmitting circuitry is also configured to transmit, to the user equipment, a radio resource control message including second information used for configuring a pattern of redundancy version for the repetitions for the transmission of the transport block. The pattern of the redundancy version is any one of a first pattern and a second pattern. The first pattern is that different redundancy versions are used the repetitions for the transmission of the transport block. The second pattern is that a same redundancy version is used the repetitions for the transmission of the transport block. The gNB also includes receiving circuitry configured to receive, based on the first information and the second information, from the user equipment, the repetition for the transmission of the transport block. The same redundancy version used for the repetitions for the transmission for the transport block is a redundancy version "zero."

A communication method of a UE is also described. The method includes receiving, from a base station apparatus, a radio resource control message including first information used for configuring a number of repetitions for transmission of a transport block. The method also includes receiving, from the base station apparatus, a radio resource control message including second information used for configuring a pattern of redundancy version for the repetitions for the transmission of the transport block. The pattern of the redundancy version is any one of a first pattern and a second pattern. The first pattern is that different redundancy versions are used the repetitions for the transmission of the transport block. The second pattern is that a same redundancy version is used the repetitions for the transmission of the transport block. The method further includes performing, based on the first information and the second information, to the base station apparatus, the repetition for the transmission of the transport block. The same redundancy version used for the repetitions for the transmission for the transport block is a redundancy version "zero."

A communication method of a gNB is also described. The method includes transmitting, to a user equipment, a radio resource control message including first information used for configuring a number of repetitions for transmission of a transport block. The method also includes transmitting, to the user equipment, a radio resource control message including second information used for configuring a pattern of redundancy version for the repetitions for the transmission of the transport block. The pattern of the redundancy version is any one of a first pattern and a second pattern. The first pattern is that different redundancy versions are used the repetitions for the transmission of the transport block. The second pattern is that a same redundancy version is used the repetitions for the transmission of the transport block. The method further includes receiving, based on the first information and the second information, from the user equipment, the repetition for the transmission of the transport block. The same redundancy version used for the repetitions for the transmission for the transport block is a redundancy version "zero."

Another UE is described. The UE includes a higher layer processor configured to receive a Radio Resource Control (RRC) message including one or more information (which may be referred to as first information) used for configuring a physical uplink shared channel (PUSCH) resource(s), a repetition pattern (e.g., a pattern of a hopping (s), and/or a Physical Hybrid-ARQ Indicator Channel (PHICH) resource(s) (e.g., a time resource (e.g., a subframe(s), a slot(s), and/or a symbol(s), a frequency resource, and/or a search space) in which the UE monitors the PHICH resource(s)). Namely, the set of the PHICH candidates that the monitors may be referred to as a search space. As used herein, the search space of the PHICH is a set of resource that may possibly be used for the PHICH transmission. Here, the PUSCH resource(s), the repetition pattern (e.g., a pattern of hopping (e.g., a frequency hopping)), and/or a Physical Hybrid-ARQ Indicator Channel (PHICH) resource(s) may be the same information, and/or different information.

The higher layer processor may also be configured to receive a RRC message including one or more information (which may be referred to as second information) configuring a repetition number K (e.g., the number of the repetition(s) of PUSCH transmission(s) (e.g., the uplink data transmission(s) on the PUSCH resource(s)).

The UE may start the PUSCH transmission(s) with the number K of the repetition(s) (e.g., using the configured number K of the repetition(s)) according to the first information and/or the second information, when a transport block (TB) arrives. Namely, the K repetition(s) may include an initial transmission. Also, the UE may monitor the PHICH (i.e., the PHICH resource) according to the first information and/or the second information. Namely, the UE may attempt to decode the PHICH in the configured time resource. Also, the UE may attempt to decode the PHICH in the configured frequency resource. Also, the UE may attempt to decode the PHICH in the configured search space. And, if ACK is received (e.g., the ACK is received on the PHICH), the UE may stop the PUSCH transmission(s) (i.e., the transmission of the TB (i.e., a same TB)). Also, if NACK is received (e.g., the NACK is received on the PHICH), the UE may start or continue the PUSCH transmission(s) (e.g., non-adaptive transmission(s), non-adaptive repetition(s)) for the TB (i.e., the same TB).

Also, the UE may receive, on a physical downlink channel (PDCH) resource, third information indicating an uplink grant of the one or more PUSCH transmissions. The third information may be referred to as an uplink grant. Also, the third information may be included in the uplink grant. The UE may start or continue, based on the detection of the third information, the PUSCH transmission(s) (e.g., adaptive transmission(s) of TB (e.g., the same TB and/or the new TB), adaptive repetition(s) of TB (e.g., a same TB or a new TB).

The third information may be used for granting the one PUSCH transmission (i.e., dynamically scheduled one PUSCH transmission). Also, the third information may be used for granting the one or more PUSCH transmissions (i.e., dynamically scheduled one or more PUSCH transmission). For example, there may be an initial transmission of the one PUSCH transmission (a dynamically scheduled single PUSCH transmission may be referred to as the first PUSCH initial transmission). Also, there may be a retransmission of the one PUSCH transmission (a dynamically scheduled single PUSCH transmission may be referred to as the first PUSCH retransmission).

Also, as described above, there may be an initial transmission of the K repeated PUSCH transmission(s) (which may be referred to as the second PUSCH initial transmission). Also, as described above, there may be a retransmission(s) of the K repeated PUSCH transmission(s) (which may be referred to as the second PUSCH retransmission (e.g., the second PUSCH repetition(s)). For example, the uplink grant (e.g., the uplink grant including the third information) may be used for granting the first PUSCH initial transmission, the first PUSCH retransmission, the second PUSCH initial transmission, and/or the second PUSCH retransmission(s).

In another example, there may be 2-bit information field(s) included in the uplink grant (e.g., as the third information). Each value of the 2-bit information field(s) may be used for indicating the granting of the first PUSCH initial transmission, the first PUSCH retransmission, the second PUSCH initial transmission, and/or the second PUSCH retransmission(s).

Another base station is also described. The behavior of the base station may correspond to the behavior of the UE as described above. The base station includes a higher layer processor configured to transmit a RRC message including first information configuring a PUSCH resource, a repetition pattern, and a PHICH resource.

The higher layer processor may also be configured to transmit a RRC message including second information configuring a repetition number K.

The higher layer processor may be further configured to receive repetitions according to the first information and the second information. The higher layer processor may be additionally configured to send the PHICH according to the first information. If the TB is decoded successfully, then ACK may be sent out, and if not, then NACK may be sent out.

The higher layer processor may also be configured to transmit, on a physical downlink channel (PDCH) resource, third information indicating an uplink grant. The uplink grant may indicate a repetition resource and the repetition pattern.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. A new radio base station may be referred to as a gNB. A gNB may also be more generally referred to as a base station device.

The systems and methods described herein teach approaches for URLLC transmission/retransmission management to meet the latency/reliability requirement. Some key requirements for URLLC relate to user (U)-plane latency and reliability. For URLLC, the target user plane latency is 0.5 milliseconds (ms) each way for both UL and DL. The target reliability is 1-10-5 for X bytes within 1ms.

These URLLC-specific constraints make the hybrid automatic repeat request (HARQ) and retransmission mechanism design difficult. For example, the receiver must reply with a quick acknowledgement (ACK) or negative acknowledgement (NACK) to meet the latency requirement, or the transmitter can retransmit immediately without waiting for ACK/NACK to enhance the reliability. The described systems and methods teach URLLC HARQ/retransmission design in different cases.

Several procedures for transmission/retransmission design for ultra-reliable and low latency communications are described herein. In a first case (Case-1), the procedure may include a DL transmission with a quick ACK/NACK. In a second case (Case-2), the procedure may include uplink repetitions until an ACK is received. In a third case (Case-3), the procedure may include uplink repetitions with a fixed number K. In a fourth case (Case-4), the procedure may include K uplink repetitions with early termination.

Downlink HARQ/retransmission design is described herein. Design for downlink here focuses on Case-1. Two major issues are discussed: (1) HARQ timing and (2) DL/UL switching in TDD for a quick ACK/NACK.

With regard to HARQ timing, in general, after the UE receives DL transmission at time N, it should response with ACK/NACK at timing N+k. In NR, N (or k) can be the index (or number) of subframes, slots, mini-slots, and/or even OFDM symbols (i.e., N or k may be denoted by using the index of a subframe(s), a slot(s), a mini-slot(s), and/or a symbol(s)). In an implementation, k should be as small as possible to meet the latency requirement, but it is not necessary for all the cases. In an aspect, this disclosure teaches how to configure the number k.

Regarding DL/UL switching in TDD for a quick ACK/NACK, a system frame may be configured as a DL-heavy frame, but a sporadic URLLC DL transmission may occur and requires a quick ACK/NACK. In this case, a DL subframe can be dynamically switched to UL subframe to carry the ACK/NACK.

Uplink HARQ and/or Uplink (re)transmission (which may be referred to as Uplink HARQ/retransmission) design is also described herein. Design of the uplink corresponds to Case-2, Case-3 and Case-4. The following issues are addressed in the design.

Resource allocation for repetitions of the same TB is one aspect of the uplink HARQ/retransmission design described herein. Regarding redundancy version (RV), each repetition can use the same RV of a coded TB, which means each repetition uses the same copy of data. On the other hand, the repetitions can also use different RVs. In this case, some mechanisms (implicit or explicit) should be provided to make sure that the UE and gNB/eNB know the RV of each repetition. Here, the information used for indicating the RV may be included in the uplink grant (i.e., the uplink grant including the third information).

Regarding MCS, each repetition can use a different MCS for the same TB. The resource sizes can be different for each repetition so that each repetition can use a different MCS. Some mechanisms (implicit or explicit) should be provided to make sure that the UE and gNB/eNB know the MCS of each repetition. Here, the information used for indicating the MCS may be included in the uplink grant (i.e., the uplink grant including the third information). The RV and the MCS may be indicated by using the same information field(s) included in the uplink grant.

The hopping mechanisms of repetitions for the same TB may be implemented in one or more approaches. The hopping pattern may be in the frequency domain (e.g., the frequency hopping(s), i.e., the frequency resource hopping(s)). The hopping pattern may be in the time domain (e.g., the subframe hipping(s), the slot hopping(s), the symbol hopping(s), i.e., the time resource hopping(s)). The hopping pattern may be in the spatial domain (e.g., the antenna port(s) hopping(s), i.e., the spatial resource hoping(s)). Any combination of these approaches may be used. It should be noted that when the hopping mechanism is configured, the RV or MCS of each repetition at a corresponding resource location may be fixed. In this case, the UE and gNB/eNB know the RV or MCS of each repetition. The repetition number K in Case-3 and Case-4 may impact the selection of the hopping pattern.

The repetition number K in Case-3 and Case-4 is another aspect of the uplink HARQ/retransmission design described herein. The value(s) of K are described herein. Also, how to inform the UE of the repetition number K is described.

How to trigger the repetitions is another aspect of the uplink HARQ/retransmission design described herein. In an approach, the repetitions may be grant-free. In another approach, the hopping pattern is preconfigured and then the UE just starts repetitions if it has URLLC data. In yet another approach, the repetitions may be triggered by downlink control information (DCI). The DCI may indicate a hopping pattern or repetition number K dynamically.

The PHICH and/or PDCCH (which may be referred to as PHICH/PDCCH) to indicate a retransmission is another aspect of the uplink HARQ/retransmission design described herein. An ACK may be used to indicate a successful reception of a TB after repetitions, or to terminate repetitions. A NACK may be used to trigger a non-adaptive retransmission(s) and/or a non-adaptive repetition(s). A PDCCH may be used to trigger an adaptive retransmission(s) and/or an adaptive repetition(s). It should be noted that "the non-adaptive" means that the same resource/hopping pattern is used while "the adaptive" means that the resource/hopping pattern is dynamically assigned (i.e., can be dynamically scheduled).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for ultra-reliable and low latency communication operations may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), Medium Access Control Protocol Data Unit (MAC PDU), and/or UL-SCH (Uplink-Shared Channel)).

Here, UL data may include URLLC data. The URLLC data may be UL-SCH data. Here, URLLC-PUSCH (i.e., different Physical Uplink Shared Channel from PUSCH) may be defined for transmitting the URLLC data. The URLLC-PUSCH described herein is assumed to be included in the PUSCH for the sake of simple description.

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

For semi-static resource allocation (also referred to as semi-persistent scheduling (SPS)), there are several basic procedures: radio resource control (RRC) configuration (e.g., a RRC message, a RRC signal), activation, UL transmission and deactivation. The RRC configuration may be exchanged between the gNB 160 and the UE 102 through a RRC layer. The RRC signal may be included in a higher layer signal. At the beginning, the gNB 160 should allocate an SPS resource (e.g., a Physical Resource Block (PRB) index of SPS resource) and function to a specific UE 102 by SPS-Config, which is shown in the SPS-Config information element of Listing-1.

Here, the SPS resource may include (correspond to) an UL resource, a frequency resource, UL-SCH resource, and/or or PUSCH resource. Also, the gNB 160 may allocate SPS resource, which is shown in the URLLC-Config information element of Listing-2. Here, for example, the gNB 160 may configure a periodicity (e.g., a time resource) by using the RRC signal, and indicate a SPS resource (e.g., a frequency resource) by using a DCI format.

Also, the gNB 160 may transmit multiple configurations (e.g., multiple periodicities and multiple SPS resources) by using the RRC signal and may indicate one configuration (e.g., one periodicity and one SPS resource) by using the DCI format. Also, the gNB 160 may transmit multiple periodicities by using the RRC signal and indicate one periodicity and one SPS resource by using the DCI format. In these cases, the DCI format may be the DCI format used for activating and/or deactivating UL transmission as mentioned above.

Also, the gNB 160 may allocate a Dynamic Scheduling resource (also referred to as a DS resource). Here, the DS resource may include (correspond to) a UL resource, a frequency resource, a UL-SCH resource, and/or PUSCH resource. For example, a DS resource may be scheduled by using a DCI format to which CRC parity bits are scrambled by C-RNTI.

Also, the DS resource may be used for transmitting eMBB data. Namely, there may be the first UL transmission on the first SPS resource, the second UL transmission on the second SPS resource, and the third UL transmission on the DS resource. Here, the first SPS resource and the second SPS resource may be allocated by a different method than that mentioned above (e.g., a different RNTI may be used for allocation, a different PDCCH may be used for allocation, a different DCI format may be used for allocation, and/or a different periodicity may be used for allocation, etc.).

Here, in a case of collision of the first UL transmission and the second UL transmission in a same timing (e.g., in a same subframe, in a same slot, in a same mini-slot, and/or in a same symbol), only the second UL transmission may be performed, and the first UL transmission may be dropped. Namely, the second SPS resource may be used for UL transmission.

Also, in a case of collision of the first UL transmission and the third UL transmission in a same timing, only the third UL transmission may be performed, and the first UL transmission may be dropped. Namely, the DS resource may be used for UL transmission.

Also, in a case of collision of the second UL transmission and the third UL transmission in a same timing, only the second UL transmission may be performed, and the third transmission may be dropped. Namely, the second SPS resource may be used for UL transmission. Here, in a case of collision of the second UL transmission and the third UL transmission in a same timing, only the third UL transmission may be performed, and the second UL transmission may be dropped. Namely, the DS resource may be used for UL transmission.

Also, in a case of collision of the second UL transmission and the third UL transmission in a same timing, the second and the third transmissions are performed. Namely, the second SPS resource and/or the DS resource may be used for UL transmission. Here, in these cases, a Single-Carrier Frequency Division Multiple Access (SC-FDMA) access scheme may be applied.

---

Listing-1

```
-- ASN1START
SPS-Config ::= SEQUENCE {
    semiPersistSchedC-RNTI      C-RNTI          OPTIONAL,
    sps-ConfigDL                SPS-ConfigDL    OPTIONAL,         --
    Need ON
```

Listing-1

```
    sps-ConfigUL              SPS-ConfigUL       OPTIONAL           --
Need ON
}
SPS-ConfigDL ::= CHOICE{
    release                   NULL,
    setup                     SEQUENCE {
        semiPersistSchedIntervalDL      ENUMERATED {
                                          sf10, sf20, sf32, sf40, sf64, sf80,
                                          sf128, sf160, sf320, sf640, spare6,
                                          spare5, spare4, spare3, spare2,
                                          spare1},
        numberOfConfSPS-Processes       INTEGER (1..8),
        n1PUCCH-AN-PersistentList       N1PUCCH-AN-PersistentList,
        ...,
        [[ twoAntennaPortActivated-r10  CHOICE {
            release                     NULL,
            setup                       SEQUENCE {
                n1PUCCH-AN-PersistentListP1-r10    N1PUCCH-AN-
PersistentList
            }
        }
    OPTIONAL     -- Need ON
    ]]
    }
}
SPS-ConfigUL ::= CHOICE {
    release                   NULL,
    setup                     SEQUENCE {
        semiPersistSchedIntervalUL      ENUMERATED {-- Period of UL SPS
                                          sf10, sf20, sf32, sf40, sf64, sf80,
                                          sf128, sf160, sf320, sf640, sf1-v14xy,
                                          sf2-v14xy, sf3-v14xy, sf4-v14xy,
                                          sf5-v14xy, spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }    OPTIONAL,                                            -- Need OP
        twoIntervalsConfig              ENUMERATED {true}
    OPTIONAL,    -- Cond TDD
        ...,
        [[ p0-PersistentSubframeSet2-r12   CHOICE {
            release                     NULL,
            setup                       SEQUENCE {
                p0-NominalPUSCH-PersistentSubframeSet2-r12
    INTEGER (-126..24),
                p0-UE-PUSCH-PersistentSubframeSet2-r12
    INTEGER (-8..7)
            }
        }                                                 OPTIONAL   -
    ]],
        [[ numberOfConfUlSPS-Processes-r13        INTEGER (1..8)
    OPTIONAL -- Need OR
        ]]
    }
}
N1PUCCH-AN-PersistentList ::=    SEQUENCE (SIZE (1..4)) OF INTEGER
(0..2047)
-- ASN1STOP
```

Listing-2

```
-- ASN1START
URLLC-Config ::= SEQUENCE {
    URLLCSchedC-RNTI          C-RNTI (or URLLC-RNTI)
    OPTIONAL,                 -- Need OR
    URLLC-ConfigUL            URLLC-ConfigUL     OPTIONAL
}
URLLC-ConfigUL ::= CHOICE {
    release                   NULL,
    setup                     SEQUENCE {
        URLLCInterval         ENUMERATED {-- Period of UL SPS
```

| Listing-2 |
|---|
|                               sf10, sf20, sf32, sf40, sf64, sf80,<br>                              sf128, sf160, sf320, sf640},<br>    implicitReleaseAfter (or URLLC-Timer)    ENUMERATED {e2, e3, e4, e8},<br>    p0-URLLC                     SEQUENCE {<br>        p0-NominalPUSCH-URLLC          INTEGER (−126..24),<br>        p0-UE-PUSCH-URLLC             INTEGER (−8..7)<br>    }       OPTIONAL,                                         -- Need OP<br>N1PUCCH-AN-PersistentList ::=    SEQUENCE (SIZE (1..4)) OF INTEGER (0..2047)<br>-- ASN1STOP |

Here, more than one DCI formats may be defined for DCI transmission. For example, DCI format that may be used for scheduling of PUSCH (i.e., the uplink physical shared channel (PSCH)) is defined. For example, a DCI format 0 used for scheduling of the PUSCH may be defined. Also, as described below, a compact UL DCI format used for scheduling of the PUSCH may be defined. Namely, at least, two kinds of UL DCI format used for scheduling of the PUSCH may be defined. For example, DCI format to which CRC (Cyclic Redundancy Check) parity bits scrambled by SPS C-RNTI (Cell-Radio Network Temporary Identifier) are attached may be used for activating and/or deactivating UL data transmission (e.g., activating and/or deactivating (releasing) PUSCH resource for UL data transmission). Also, for example, DCI format to which CRC (Cyclic Redundancy Check) parity bits scrambled by URLLC C-RNTI (i.e., different RNTI from SPS C-RNTI) are attached may be used for activating and/or deactivating UL data transmission (e.g., activating and/or deactivating (releasing) PUSCH resource for URLLC data transmission). Also, for example, the DCI format to which CRC (Cyclic Redundancy Check) parity bits scrambled by C-RNTI (i.e., different RNTI from SPS C-RNTI and URLLC C-RNTI) are attached may be used for scheduling of the PUSCH (e.g., the PUSCH resource, dynamically scheduled PUSCH).

Here, URLLC-PDCCH (i.e., different Physical Downlink Control Channel from PDCCH) may be defined for transmitting DCI format that may be used for activating and/or deactivating UL data transmission (e.g., activating and/or deactivating (releasing) PUSCH resource for URLLC data transmission). Also, URLLC-DCI format (i.e., different DCI format from DCI format) that is used for activating and/or deactivating UL data transmission (e.g., activating and/or deactivating (releasing) PUSCH resource for URLLC data transmission) may be defined. Here, the URLLC-PDCCH described herein is assumed to be included in the PDCCH for the sake of simple description. Also, the URLLC-DCI format described herein is assumed to be included in the DCI format for the sake of simple description. Here, the DCI used for scheduling of the PUSCH (the PUSCH used for the UL data transmission (e.g., URLLC data transmission)) may be referred to as a compact DCI (i.e., a compact DCI format, a compact UL DCI format) used for scheduling of the PUSCH (i.e., the PUSCH resource).

Also, for example, the DCI format that may be used for scheduling of PDSCH (i.e., the downlink PSCH) is defined. For example, a DCI format 1 and/or a DCI format 1A used for scheduling of the PDSCH may be defined. Also, as described below, a compact DL DCI format used for scheduling of the PDSCH may be defined. Namely, at least, two kinds of DL DCI format used for scheduling of the PDSCH may be defined. For example, DCI format to which CRC (Cyclic Redundancy Check) parity bits scrambled by SPS C-RNTI (Cell-Radio Network Temporary Identifier) are attached may be used for activating and/or deactivating DL data transmission (e.g., activating and/or deactivating (releasing) PDSCH resource for DL data transmission). Also, for example, DCI format to which CRC (Cyclic Redundancy Check) parity bits scrambled by URLLC C-RNTI (i.e., different RNTI from SPS C-RNTI) are attached may be used for activating and/or deactivating DL data transmission (e.g., activating and/or deactivating (releasing) PDSCH resource for URLLC data transmission). Also, for example, DCI format to which CRC (Cyclic Redundancy Check) parity bits scrambled by C-RNTI (i.e., different RNTI from SPS C-RNTI and URLLC C-RNTI) are attached may be used for scheduling of the PDSCH (i.e., the PDSCH resource, dynamically scheduled PDSCH).

Here, URLLC-PDCCH (i.e., different Physical Downlink Control Channel from PDCCH) may be defined for transmitting DCI format that may be used for activating and/or deactivating DL data transmission (e.g., activating and/or deactivating (releasing) PDSCH resource for URLLC data transmission). Also, URLLC-DCI format (i.e., different DCI format from DCI format) that is used for activating and/or deactivating DL data transmission (e.g., activating and/or deactivating (releasing) PUSCH resource for URLLC data transmission) may be defined. Here, the DCI used for scheduling of the PDSCH (the PDSCH used for the DL data transmission (e.g., URLLC data transmission)) may be referred to as a compact DCI (i.e., a compact DCI format, a compact DL DCI format) used for scheduling of the PDSCH (i.e., the PDSCH resource).

Here, the compact DCI format (i.e., the compact UL DCI format, and/or the compact DL DCI format) may be used for indicating the PUCCH (e.g., the uplink physical control channel (PCCH)). Namely, the PUCCH resource(s) used for transmitting UCI (Uplink Control Information, i.e., HARQ-ACK, CSI, and/or SR) may be indicated by using DCI (Downlink Control Information) included in the compact DCI format. For example, DCI included in the compact DCI format may be used for indicating a timing (a timing offset, an index of subframe(s), an index of slot(s), an index of mini-slot(s), and/or an index of symbol(s)) in which the UCI is transmitted on the PUCCH. Also, for example DCI included in the compact DCI format may be used for indicating an index of resource (an index of physical resource(s), an index of time-frequency resource(s)) in which UCI is transmitted on the PUCCH (i.e., the index of resource corresponds to an index of the PUCCH resource). Here, the compact DCI format described herein is assumed to be included in the DCI format for the sake of simple description.

Here, the UE 102 may monitor (attempt to decode) PDCCH in a common search space and/or a UE-specific search space. Namely, the UE 102 may monitor the common search space and/or the UE-specific search space of the PDCCH. Here, the UE-specific search space may be determined based on C-RNTI, SPS C-RNTI, and/or URLLC C-RNTI. Also, the UE receives the RRC signal including information that is used for determining the UE-specific search space. Also, the UE 102 may monitor (e.g., attempt to decode) PHICH. Namely, the UE 102 may monitor the search space of the PHICH.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE URLLC module 126.

The UE URLLC module 126 may perform URLLC operations. URLLC operations may include grant-free data transmission (UL transmission without detection of downlink control information for triggering), sub-slot base data transmission, SR triggered data transmission (SR is sent before data transmission), SR-less data transmission (SR is not used), etc.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may include multiple pairs of downlink resource blocks (RBs) which is also referred to as physical resource blocks (PRBs). The downlink resource block (RB) pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs. An example of a resource grid in the downlink is discussed in connection with FIG. 2.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC. An example of a resource grid in the uplink is discussed in connection with FIG. 3.

The UE URLLC module 126 may perform URLLC uplink (UL) transmission management to meet latency/reliability requirements and to address potential coexistence issues. The key requirements for URLLC relate to U-plane latency and reliability. For URLLC, the target U-plane latency is 0.5 ms each way for both UL and DL. The target reliability is 1-10-5 for X bytes within 1ms.

Several procedures for transmission/retransmission design for ultra-reliable and low latency communications are described herein. In a first case (Case-1), the procedure may include a DL transmission with a quick ACK/NACK. An example of Case-1 is described in connection with FIG. 13.

In a second case (Case-2), the procedure may include uplink repetitions until an ACK is received. An example of Case-2 is described in connection with FIG. 14.

In a third case (Case-3), the procedure may include uplink repetitions with a fixed number K. An example of Case-3 is described in connection with FIG. 15.

In a fourth case (Case-4), the procedure may include K uplink repetitions with early termination. An example of Case-4 is described in connection with FIG. 16.

Downlink HARQ/retransmission design is described herein. The downlink HARQ/retransmission design corresponds to Case-1. An aspect (Aspect-1.1) of the downlink HARQ/retransmission design is HARQ timing configuration. Downlink data transmission in subframe (e.g., slot, mini-slot and/or OFDM symbol) N requires the HARQ ACK/NACK in subframe (e.g., slot, mini-slot and/or OFDM symbol) N+k. Namely, the UE 102 may transmit, based on the detection of the PDSCH in subframe (slot, mini-slot or OFDM symbol) N, the HARQ ACK/NACK in the subframe (slot, mini-slot or OFDM symbol) N+k. The choices of k can be preconfigured by the higher layers (e.g. RRC, MAC CE). A multi-bits signaling included in PDCCH can indicate the choice of k. Namely, a value of k may be configured/indicated by using the higher layer signaling. For example, "00" may indicate k=0; "01" may indicate k=2; "10" may indicate k=4; and "11" may indicate k=8.

When DL data is transmitted, the multi-bits signaling contained in the front-loaded PDCCH may tell the UE 102 when to use the PUCCH resource to transmit ACK/NACK. Here, for example, the gNB 160 may transmit the RRC message including information used for configuring multiple timings (e.g., four timings), and transmit the first DCI (e.g., the DCI format 1 and/or the DCI format 1A) indicating a first timing among the multiple timings. Namely, the UE 102 may transmit the UCI on PUCCH in the first timing indicated among the multiple timings. Here, the UCI transmitted in the first timing indicated among the multiple timings may correspond to the PDSCH scheduled by using the DCI (e.g., the DCI format 1 and/or the DCI format 1A).

Here, the UE 102 may transmit UCI on PUCCH in the second timing. For example, as described below, the UE 102 may transmit, on the PUCCH in the second timing, the UCI that correspond to the PDSCH scheduled by using the second DCI (e.g., the compact DCI format). In this case, the UCI may be immediately (i.e., quickly) transmitted on the PUCCH after detecting of the PDSCH. For example, the PUCCH on which the UCI is transmitted may be mapped within the subframe(s), the slot(s), the mini-slot(s), and/or the symbol(s) in which the PDCCH and/or the PDSCH are mapped. Namely, a part of a subframe(s), a slot(s), a mini-slot(s), and/or a symbols(s) reserved as the downlink transmission may be switched, based on the detection of the second DCI (e.g., the compact DCI format), to a subframe(s), a slot(s), a mini-slot(s), and/or a symbols(s) in which the UCI is transmitted on the PUCCH.

Figure 17:
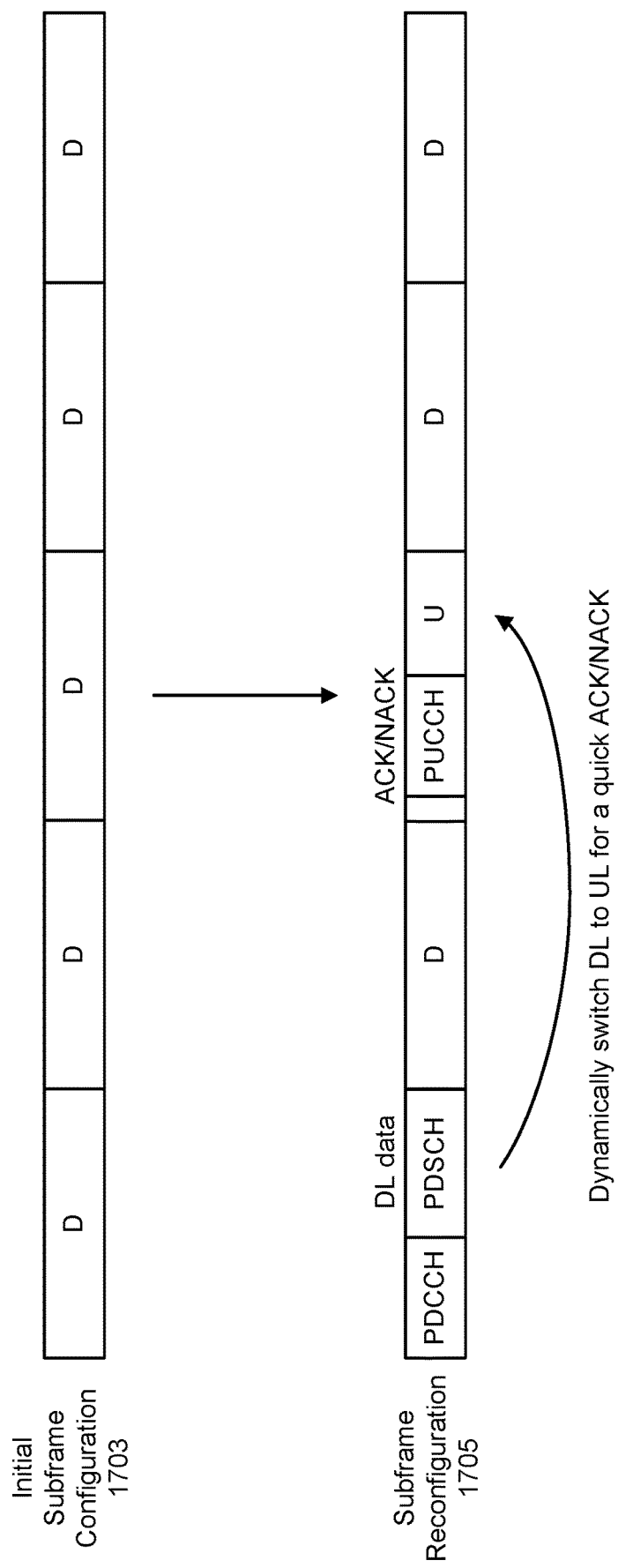
FIG. 17 is an example of DL/UL switching in time division duplexing (TDD) for a quick ACK/NACK.

Another aspect (Aspect-1.2) of the downlink HARQ/retransmission design is DL/UL switching in TDD for a quick ACK/NACK. A system frame may be configured as a DL-heavy frame, but a sporadic URLLC DL transmission may occur and may require a quick ACK/NACK. In this case, a DL subframe can be dynamically switched to UL subframe to carry the ACK/NACK. An example of this approach is described in connection with FIG. 17. Here, although FIG. 17 shows as example of a subframe(s), a slot(s), a mini-slot(s), and/or a symbol(s) may be applied to FIG. 17. Namely, the UE 102 may transmit the UCI in an uplink part (e.g., an uplink subframe(s), an uplink slot(s), an uplink mini-slot(s), and/or an uplink symbol(s)) that is changed from a downlink part (e.g., downlink subframe(s), a downlink slot(s), a downlink mini-slot(s), and/or a downlink symbols(s)) reserved for the DL data transmission (e.g., the PDSCH transmission). And, the uplink part may be changed (switched), based on the detection of the second DCI (e.g., the compact DCI format), from the downlink part. Here, the second DCI (e.g., the compact DCI format) may include information used for indicating the number of subframe(s), slot(s), mini-slot(s), and/or symbol(s) which are changed to an uplink to a downlink (e.g., the number of the downlink part that is changed to the uplink part, and/or the number of the uplink part that is changed from the downlink part).

Uplink HARQ/retransmission design is also described herein. Design of the uplink corresponds to Case-2, Case-3 and Case-4.

An aspect (Aspect-2.1) of uplink HARQ/retransmission design is resource allocation for repetitions of the same TB. Regarding resource location for repetitions (Aspect-2.1.1), transmission of the same TB can repeat in the frequency/time/spatial/code domain.

In an approach, repetitions may be in the frequency domain. This approach is described in connection with FIG. 18.

In another approach, repetitions may be in the time domain. This approach is described in connection with FIG. 19.

In another approach, repetitions may be in the spatial domain. This approach is described in connection with FIG. 20. Here, the UE 102 may transmit, in a certain timing, the uplink data (the URLLC data) using multiple antenna ports. For example, the UE 102 may transmit, in a certain timing, the uplink data (the URLLC data) using a transmission diversity (TxD) scheme. For example, the gNB 160 may transmit information used for configuring the number of the antenna port(s) (i.e., the number of the antenna port(s) used for the uplink data transmission.

Figure 21:
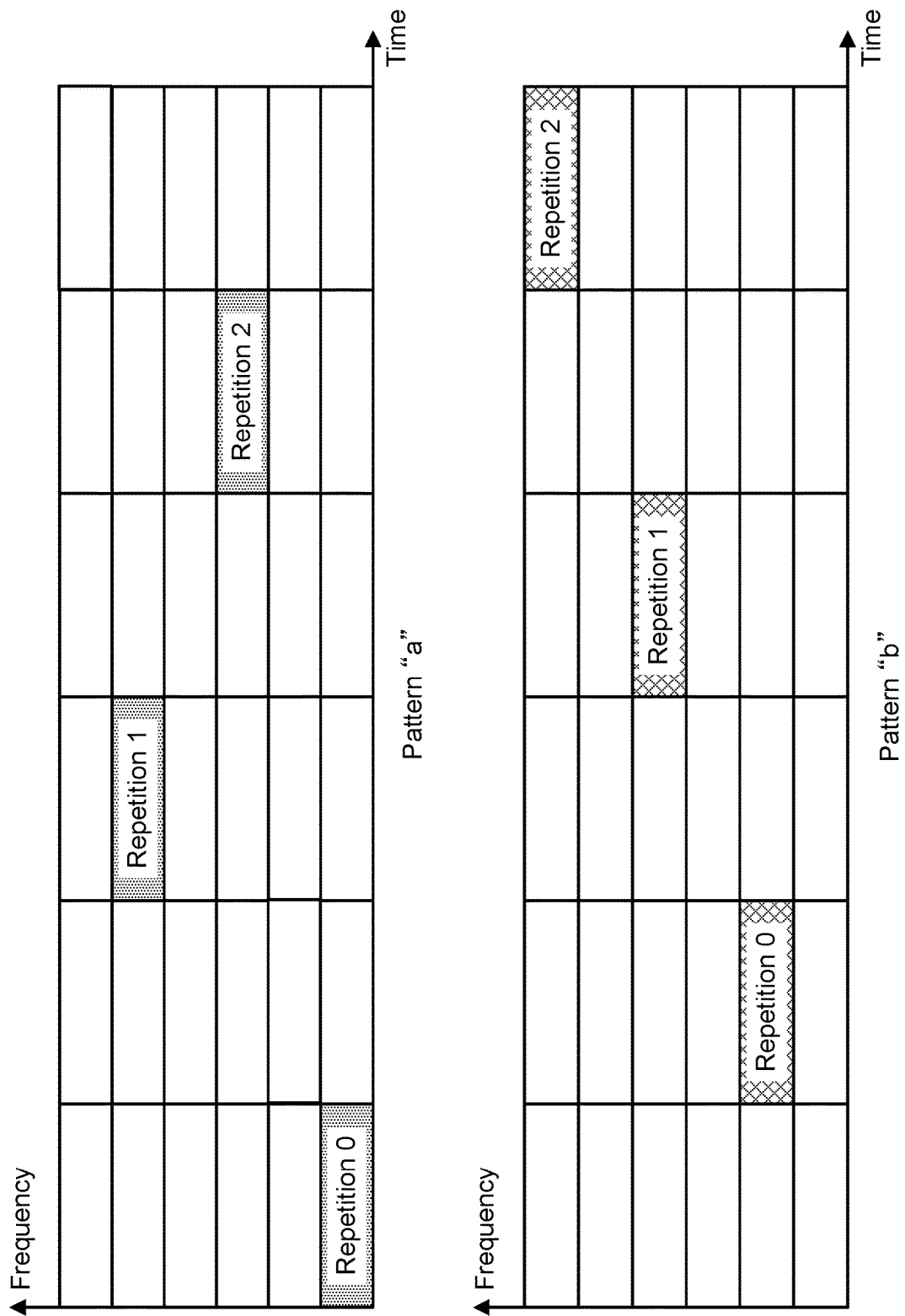
FIG. 21 is an example illustrating repetitions using a combination of time/frequency resource.

In yet another approach, repetitions may be in the code domain. Any combination of these approaches may be used. For example, repetitions in the time/frequency resources may be performed, as illustrated in FIG. 21.

It should be noted that repetition patterns (e.g., the pattern(s) of the hopping(s)) can be predefined or dynamically selected. The repetition pattern for the UE 102 can be preconfigured or dynamically assigned. The repetition pattern may have a periodicity number p, which means that UE 102 can send p more repetitions by using the same rule of the previous p repetitions. Namely, the gNB 160 may transmit information used for configuring the repetition patterns. The UE 102 may transmit, by using the PUSCH resource (s) (e.g., PUSCH resource(s) by SPS), the uplink data (e.g., the URLLC data) with the configured pattern(s) of the hopping(s).

The relationship among repetitions is another aspect (Aspect-2.1.2) of uplink HARQ/retransmission design described herein. Repetitions of the same TB may use the same redundancy version and/or MCS. In this case, each repetition may use the same copy of the coded TB. Alternatively, repetitions of the same TB may use a different redundancy versions (RVs). In this case, each repetition may use a different RV of the same TB. An example of the relationship among repetitions is described in connection with FIG. 22.

In yet another alternative, repetitions of the same TB may use the different modulation and coding schemes (MCS). In this case, each repetition may use a different MCS for the same TB. An example of repetitions of the same TB using different MCS is described in connection with FIG. 23.

Another aspect (Aspect-2.2) of uplink HARQ/retransmission design is how to indicate the repetition pattern. As described above, the repetition pattern may be used for determining the resource location, the RV and/or the MCS of each repetition. Both the UE 102 and base station (i.e., gNB 160) should know the repetition pattern when transmitting. The following approaches may be used to indicate the repetition pattern. Namely, the PUSCH resource used for transmitting the uplink data may corresponding to the number of the transmission(s) (e.g., a value of the transmission) during the K repetition(s). For example, in a case that the UE 102 performs the uplink data transmission on the first PUSCH resource, the uplink data transmission may be the first transmission during the K repetitions.

Also, in a case that the UE 102 performs the uplink data transmission on the second PUSCH resource, the uplink data transmission may be the second transmission during the K repetitions. Namely, the PUSCH resource on which the UE 102 performs the PUSCH transmission may correspond to the number of the uplink data transmission during the K repetitions. As described above, the UE 102 may transmit, using the hopping, the uplink data with the K repetition(s). Namely, the pattern(s) of the hopping(s) may correspond to the number of the uplink transmission during the K repetitions. In an example, the pattern(s) of the hopping(s) may be defined (configured, and/or indicated) by using the value of K. In another example, the pattern(s) of the hopping(s) may be defined as an equation including a parameter related to the value of K.

Here, as described above, the value of K may be configured by using the RRC message. Also, as described above, the value of K may be indicated by using the DCI. Also, a UE identity and/or an index of antenna port(s) may be included in the uplink data during the K repetitions.

The gNB 160 may recognize, based on the UE identity and/or the index of antenna port(s), the number of the transmission during the K repetitions. For example, in a case that the UE 102 performs the uplink data transmission on the first PUSCH resource using the antenna port 1, the uplink data transmission may be the first transmission during the K repetitions. Also, in a case that the UE 102 performs the uplink data transmission on the second PUSCH resource using the antenna port 1, the uplink data transmission may be the second transmission during the K repetitions. Namely, the PUSCH resource on which the UE performs the uplink data transmission using an antenna port 1, 2, 3, and/or 4 may correspond to the number of the uplink transmission during the K repetitions.

In a first approach (Approach-2.2.1), the RRC signaling may be used for indicating the repetition pattern. In this approach, the repetition pattern for the UE 102 is configured by the base station 160 by using the RRC signaling. When the UE 102 starts the repetitions, it follows the pattern.

In a second approach (Approach-2.2.2), SPS activation may indicate a repetition pattern. In this approach, the base station 160 may inform the UE 102 of the repetition pattern by SPS activation. The activation can be triggered by DCI or MAC.

In a third approach (Approach-2.2.3), an UL grant may indicate a repetition pattern. In this approach, the base station 160 may inform the UE 102 of the repetition pattern by UL grant.

In a fourth approach (Approach-2.2.4), the common PDCCH may indicate a repetition pattern. In this approach, the UE 102 may search the common PDCCH to obtain the repetition pattern.

In a fifth approach (Approach-2.2.5), any combination of the above approaches may be used to indicate a repetition pattern. As an example, some repetition patterns can be preconfigured by higher layer signaling. The choices of repetition patterns can be preconfigured by the higher layers (e.g. RRC, MAC CE). A multi-bits signaling included in PDCCH can indicate the choice of repetition pattern. For example, "00" may indicate repetition pattern a; "01" may indicate repetition pattern b; "10" may indicate repetition pattern c; and "11" may indicate repetition pattern d.

Another aspect (Aspect-2.3) of uplink HARQ/retransmission design is the repetition number K. In Case-3 and Case-4, there may be a predefined repetition number K. The value of K may be independent of the repetition periodicity p for a repetition pattern mentioned in connection with Aspect-2.1.1. The values can be the same.

Another aspect (Aspect-2.4) of uplink HARQ/retransmission design is how to indicate repetition number K. In Case-3 and Case-4, both the UE 102 and the base station 160 should know repetition number K when transmitting. The following approaches can be used to indicate repetition number K.

In a first approach (Approach-2.4.1), the RRC signaling may be used for indicating the repetition number K. In this approach, the repetition number K for the UE 102 may be configured by the base station 160 by using the RRC signaling. When the UE 102 starts the repetitions, it follows the repetition number K.

In a second approach (Approach-2.4.2), SPS activation may indicate the repetition number K. In this approach, the base station 160 may inform the UE 102 of the repetition number K by SPS activation. The activation can be triggered by DCI or MAC.

In a third approach (Approach-2.4.3), a UL grant may indicate the repetition number K. In this approach, the base station 160 may inform the UE 102 of the repetition number K by UL grant.

In a fourth approach (Approach-2.4.4), a Common PDCCH may indicate the repetition number K. In this approach, the UE 102 can search the common PDCCH to obtain the repetition number K.

In a fifth approach (Approach-2.4.5), any combination of the above approaches may be used to indicate the repetition number K. As an example, some values of repetition number K can be preconfigured by higher layer signaling. The choices of repetition number K can be preconfigured by the higher layers (e.g. RRC, MAC CE). A multi-bits signaling included in PDCCH can indicate the choice of repetition number K. For example, "00" may indicate K=1; "01" may indicate K=2; "10" may indicate K=4; and "11" may indicate K=8.

Another aspect (Aspect-2.5) of uplink HARQ/retransmission design is how to trigger the repetitions. The K repetitions can be treated as an initial transmission (i.e., a repetition 0) and K−1 automatic retransmission(s) of a same TB. The following approaches may be used to start the repetition 0.

A first approach (Approach-2.5.1) to triggering the repetitions is grant-free. In this approach, the UE 102 may start the repetitions if it has URLLC data without a UL grant from the base station 160. The repetition pattern may be predefined. The UE 102 may start the repetition 0 at any resource position of the repetition pattern, or the UE 102 may wait for a specific resource position of the repetition pattern and start the repetition 0 at this position.

A second approach (Approach-2.5.2) to triggering the repetitions is grant-based. In this approach, the base station 160 may tell the UE 102 when and how to start the repetitions by sending out a UL grant. Approach-2.2.3 and Approach-2.4.3 can be utilized here.

In a third approach (Approach-2.5.3), the repetitions may be triggered by simplified signaling. The repetition pattern(s) and/or repetition number K can be preconfigured. The UE 102 only needs a trigger by simplified signaling to start the repetitions. Approach-2.2.5 and Approach-2.4.5 can be utilized here for triggering. For all the approaches above, timing between the trigger and corresponding repetition should be predefined or dynamically indicated. The trigger can be a TB arrival, a UL grant, a simplified signaling or a NACK, which depends the adopted approach. The timing can be determined in different ways. In a first approach, the timing is fixed by specification (e.g., the UE 102 receives the trigger (e.g. simplified signaling in Approach-2.5.3)) in subframe (slot, mini-slot or OFDM symbol) N and then send out repetition 0 in subframe (slot, mini-slot or OFDM symbol) N+k and k is fixed as 4. In a second approach, the timing is configured by higher layer (RRC or MAC CE). In a third approach, the timing is indicated by DCI dynamically. In a fourth approach, the timing is indicated by a field in the DCI from a set of values and the set of values is configured by higher layer (RRC or MAC CE).

Another aspect (Aspect-2.6) of uplink HARQ/retransmission design is how to terminate repetitions or start retransmissions. Repetitions are aimed to guarantee a successful reception of a TB and to enhance the reliability. Signaling is needed to acknowledge a successful transmission or start a new round of retransmission(s). PHICH or equivalent can provide 1-bit information indicating a positive acknowledgement (ACK) and/or a negative acknowledgement (NACK). In addition, a UL grant may be used to start an adaptive retransmission(s). Different approaches may be used for different cases.

A first approach (Approach-2.6.1) may be used for Case-2 (i.e., uplink repetitions until an ACK is received). In this approach, the UE 102 may repeat transmission of a same TB by following a predefined or dynamically scheduled repetition pattern until it receives an ACK through PHICH or equivalent. Here, the terminology "PHICH" is used in the following but a new/alternative signaling design may be used.

The PHICH resource may be configured by higher layer signaling. The periodicity of the PHICH resource can be aligned with a repetition gap/period. In other words, PHICH may be used every q (where q=1, 2, 3 . . . ) repetitions and the UE 102 should monitor PHICH every repetitions. In a different design, the periodicity of the PHICH resource can be independent of the repetition gap/period. Timing between UL repetition and corresponding PHICH should be predefined or dynamically indicated. In the case that one PHICH is corresponding to a group of q repetitions, only the timing between the last repetition in the group and corresponding PHICH is necessary since UE 102 only need to monitor PHICH after a group of q repetitions are transmitted. The timing can be determined in different ways. In a first approach, the timing is fixed by specification, e.g. base station receives a repetition in subframe (slot, mini-slot or OFDM symbol) N and then send out a response through PHICH in subframe (slot, mini-slot or OFDM symbol) N+k and k is fixed as 4. In a second approach, the timing is configured by higher layer (RRC or MAC CE). In a third approach, the timing is indicated by DCI dynamically. In a fourth approach, the timing is indicated by a field in the DCI from a set of values and the set of values is configured by higher layer (RRC or MAC CE).

In general, PHICH can carry 1-bit information. One is ACK (e.g. '1') and the other is NACK (e.g. '0'). In an equivalent design, '1' may be used to indicate NACK and '0' to indicate ACK. How to use PHICH information results in different designs.

In a first approach, the base station 160 does not use PHICH until it decodes the UL data successful and then sends out an ACK through PHICH. The UE 102 may monitor every PHICH and may stop repeating after receiving an ACK.

In a second approach, the base station 160 uses every PHICH and the UE 102 may monitor every PHICH. Both NACK and ACK are used. NACK means the UE 102 should continue the repetitions and ACK means the UE 102 should stop the repetitions. In both the first approach and the second approach, there is a possible scenario where the base station 160 continues to send out acknowledgement(s) for the same TB after the first ACK is sent out because the timing between the ACK and corresponding repetition can be much longer than the duration between two adjacent repetitions. For example, after receiving repetition 0 which is sent out at timing N and repetition 1 which is sent out at timing N+1, the base station 160 may decode the TB successfully and may send out the ACK at timing N+4. However, between timing N+1 and timing N+4, there is repetition 2 at timing N+2 and repetition 3 at timing N+3 which can also trigger the acknowledgement from the base station 160 after timing N+4.

How to deal with the remaining acknowledgement(s) for the same TB is defined. In a simple design, after receiving the first ACK, the UE 102 stops repetitions and ignores the possible remaining responses from the base station 160 for the same TB. In a different design, after receiving the first ACK, the UE 102 stops repetitions and monitors the remaining responses. If the remaining response(s) indicate positive acknowledgement(s), the UE 102 can flush the data buffer. Otherwise, the UE 102 should restart the repetition for the same TB.

In a third approach, for the case of a fake ACK due to decoding error, the UE 102 may stop the repetitions until r (where r=1, 2, 3, . . . ) consecutive ACK is received.

In a fourth approach, NACK means the UE 102 can transmit at another predefined resource for the same TB.

A second approach (Approach-2.6.2) may be used for Case-3 (i.e., uplink repetitions with a fixed number K). In this approach, the UE 102 may repeat transmission of a same TB K times by following a predefined or dynamically scheduled repetition pattern. This approach teaches the transmission/retransmission design after the K repetitions are finished.

The PHICH resource may be configured by higher layer signaling. The PHICH resource only needs to be aligned with the K repetitions. In other words, the PHICH is used after K repetitions are finished and the UE 102 should monitor that PHICH K repetitions are finished. Timing between the K-th repetition (repetition K−1) and corresponding PHICH should be predefined or dynamically indicated. The timing can be determined in different ways. In a first approach, the timing is fixed by specification, e.g. base station receives the last repetition (i.e. K-th repetition, or repetition K−1) in subframe (slot, mini-slot or OFDM symbol) N and then send out a response through PHICH in subframe (slot, mini-slot or OFDM symbol) N+k and k is fixed as 4. In a second approach, the timing is configured by higher layer (RRC or MAC CE). In a third approach, the timing is indicated by DCI dynamically. In a fourth approach, the timing is indicated by a field in the DCI from a set of values and the set of values is configured by higher layer (RRC or MAC CE).

After the K repetitions are finished, if the UE 102 receives ACK, the UE 102 does not transmit and it may start transmission(s) for another TB. If the UE 102 receives NACK, the UE 102 starts non-adaptive repetitions for the same TB by using previous repetition pattern and repetition number K.

In the case that a UL grant is used, the UE 102 uses adaptively repetitions, which means repetition pattern and/or repetition number K can be dynamic changed. Adaptive repetition resource can override the configured repetition resource. Additional bit(s) can be used to indicate the transmission(s) is for new data or not.

A third approach (Approach-2.6.3) may be used for Case-4 (i.e., K uplink repetitions with early termination). It should be noted that Case-4 is a combination of Case-2 and Case-3. Thus, a mechanism can be designed by combining Approach-2.6.1 and Approach-2.6.2. Before the K repetitions are finished, the UE 102 and base station 160 may follow the mechanism of Approach-2.6.1. After the K repetitions are finished, the UE 102 and base station 160 may follow the mechanism of Approach-2.6.2.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB URLLC module 194. The gNB URLLC module 194 may perform URLLC operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
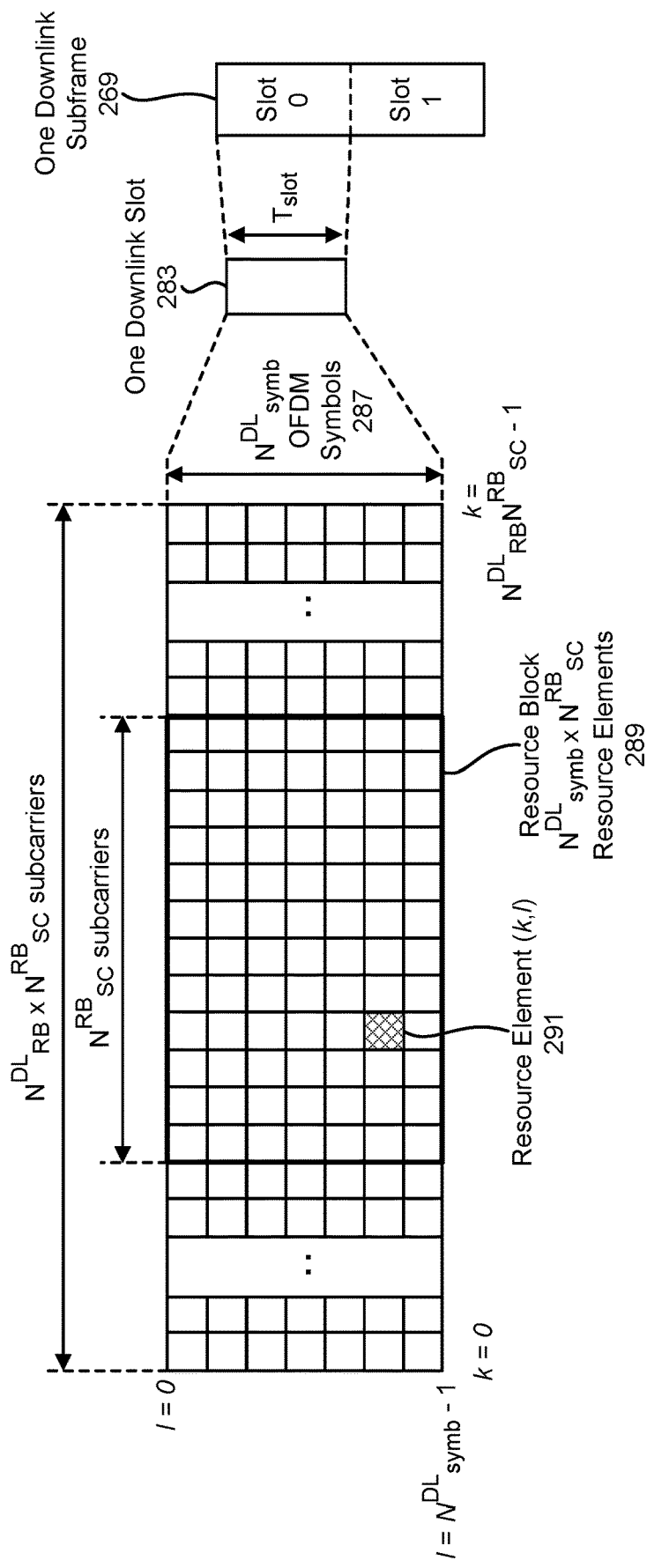
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{DL}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
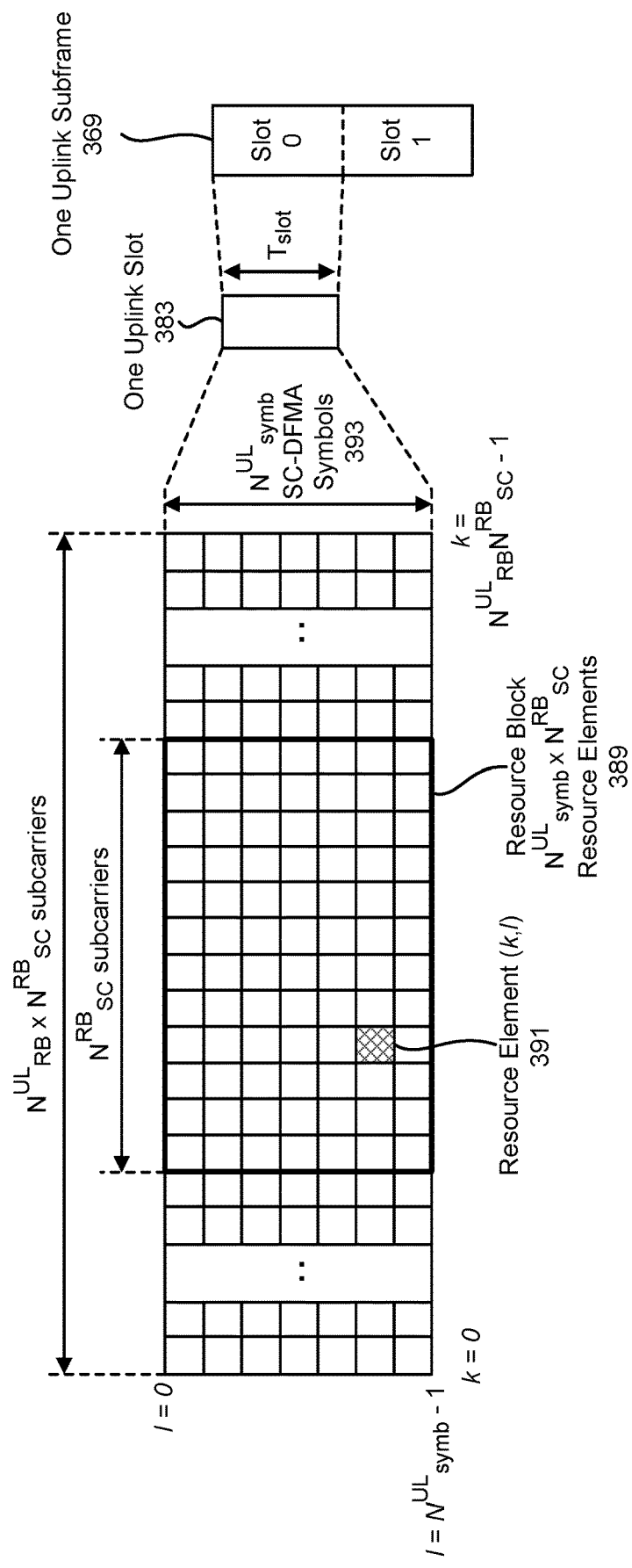
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
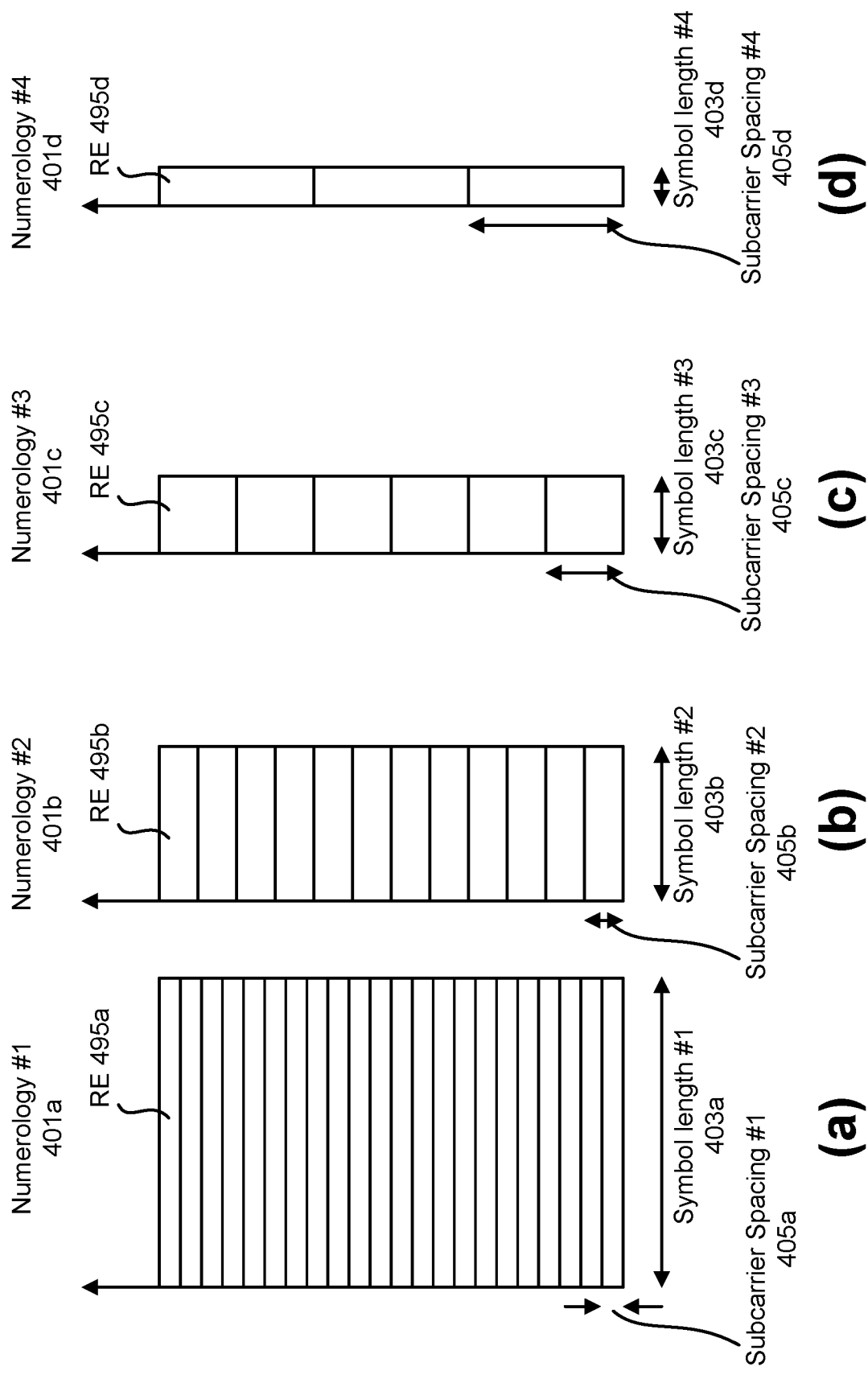
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
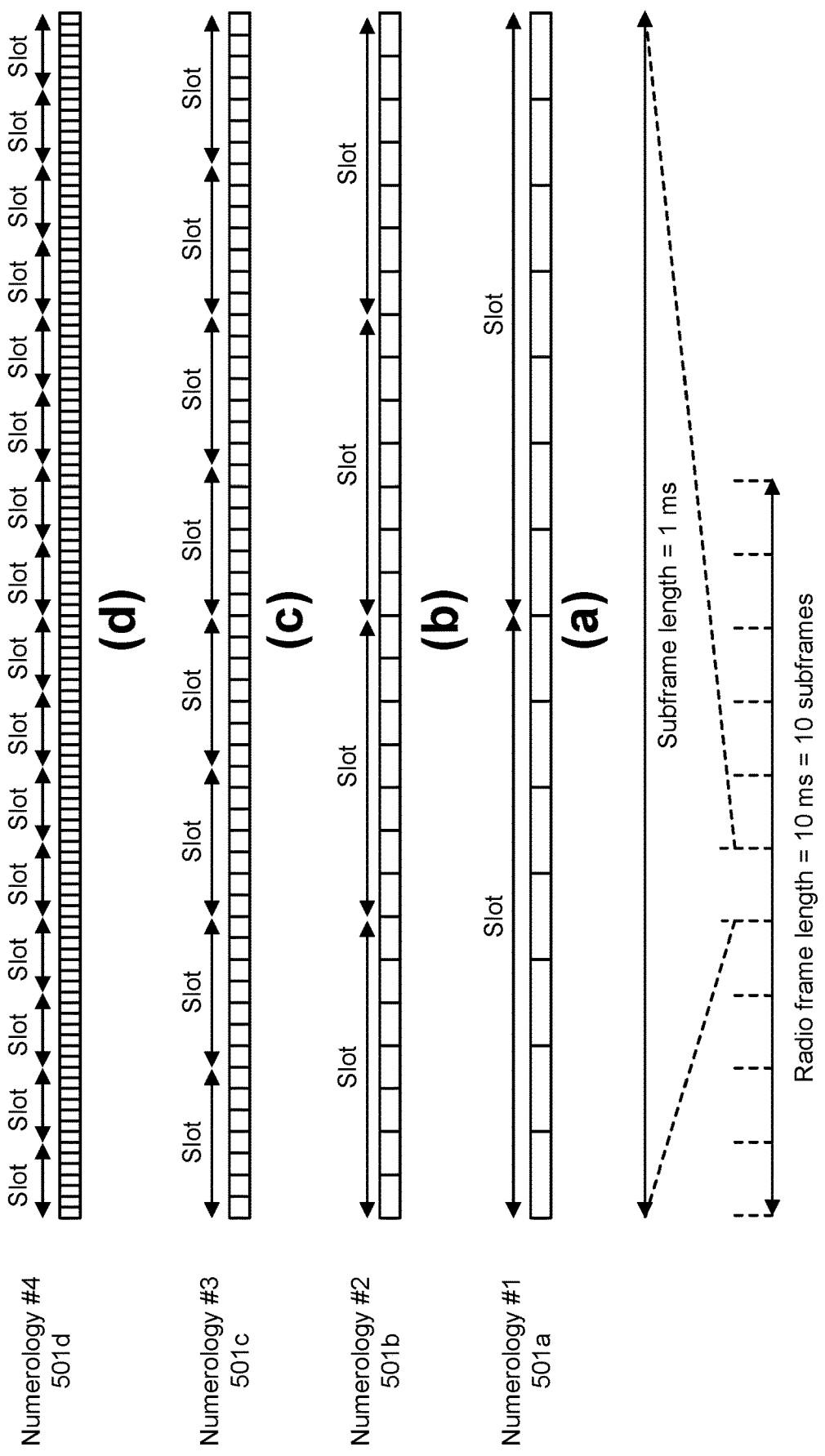
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
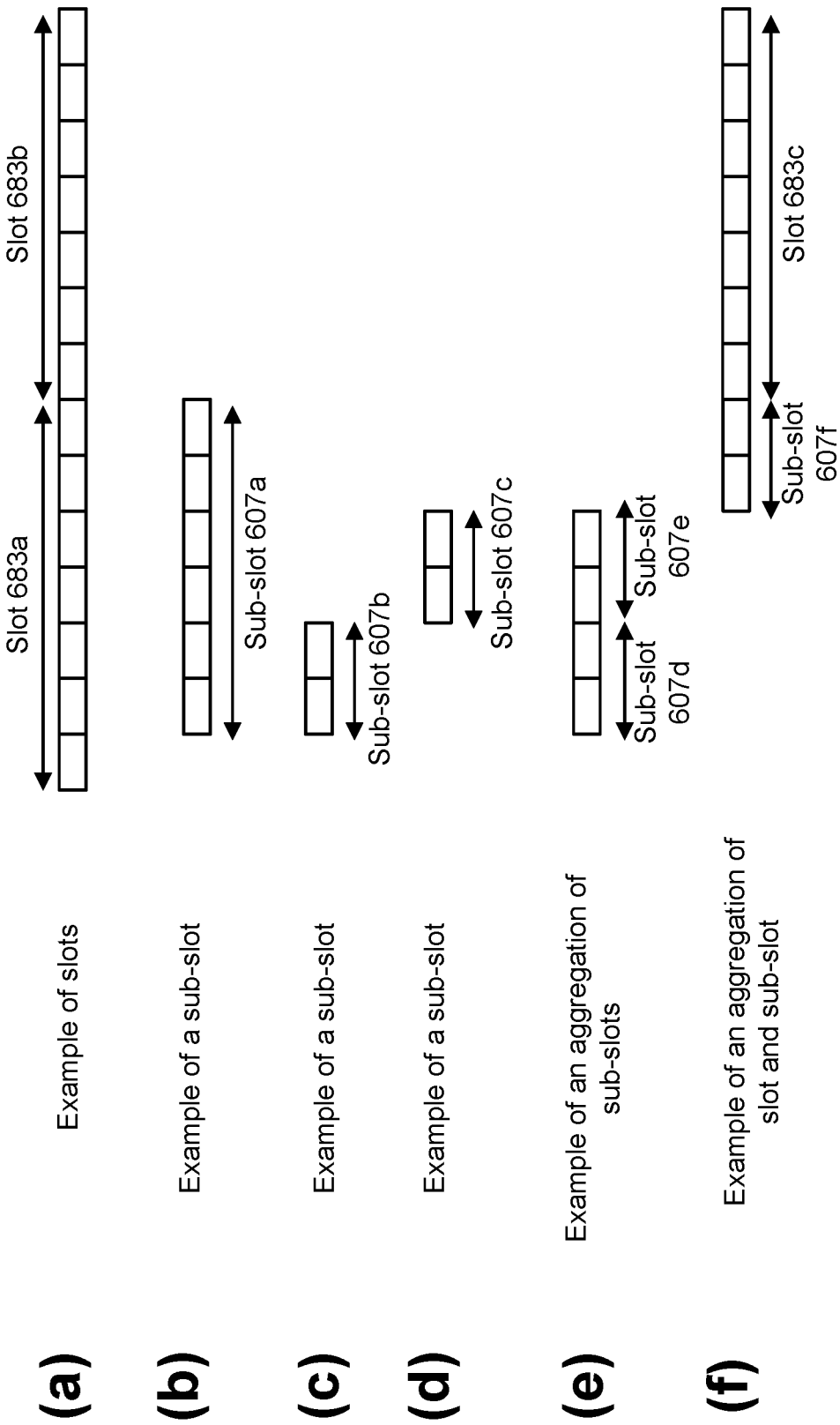
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
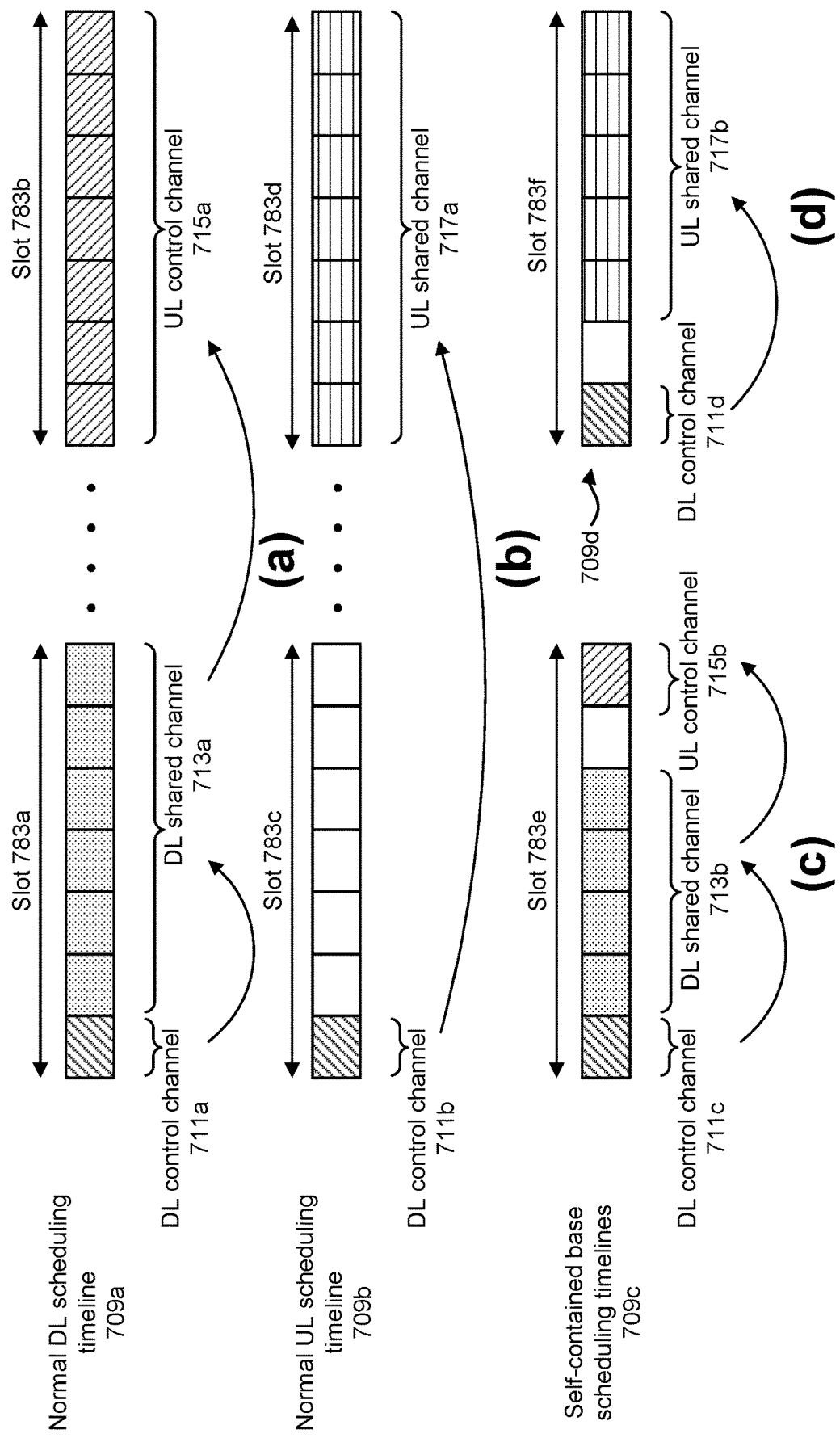
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
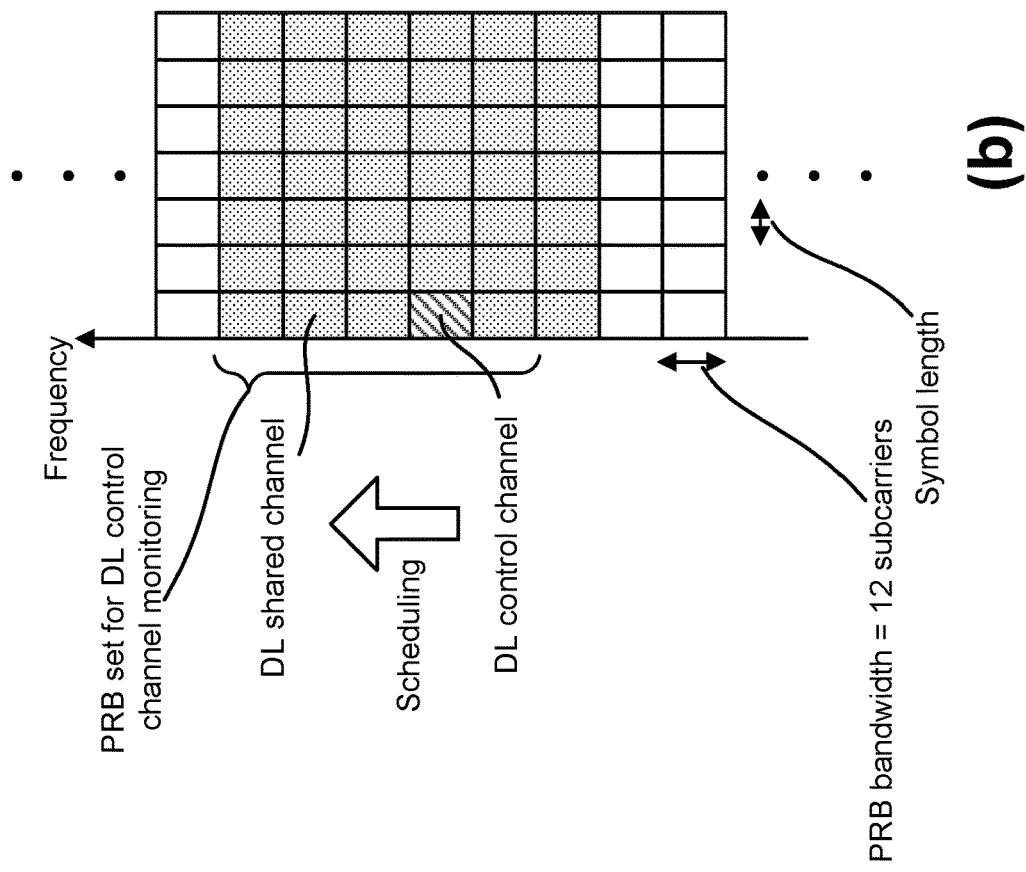
FIG. 8 shows examples of downlink (DL) control channel monitoring regions.
Figure 8:
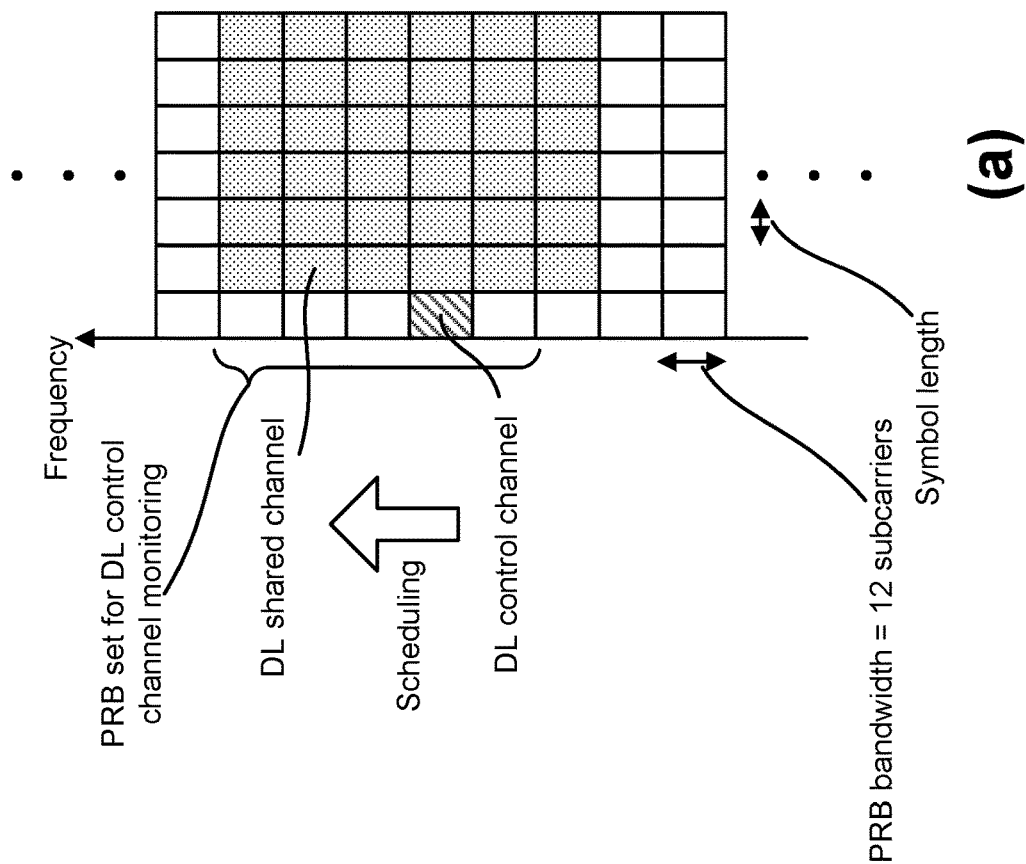

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
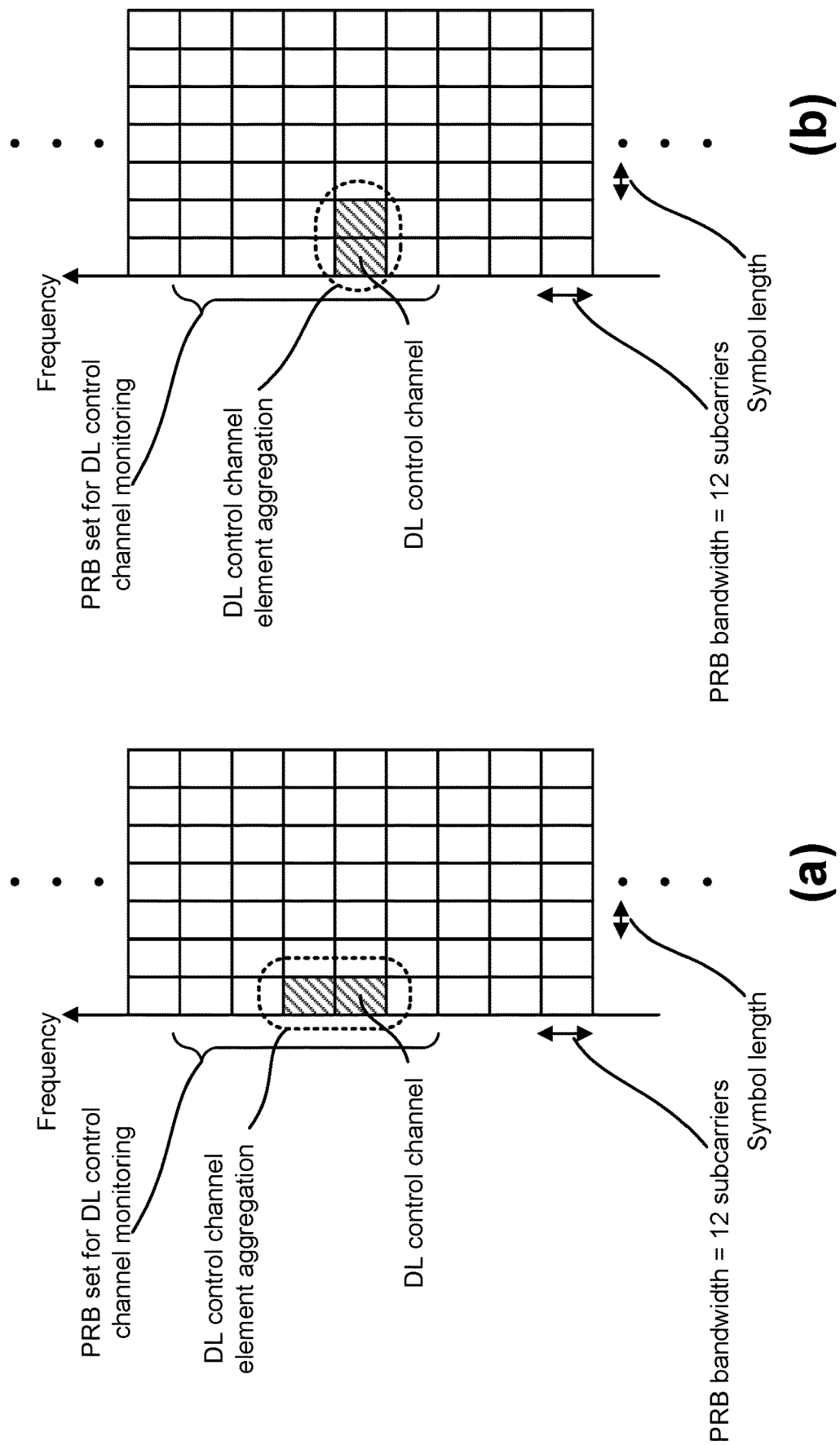
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
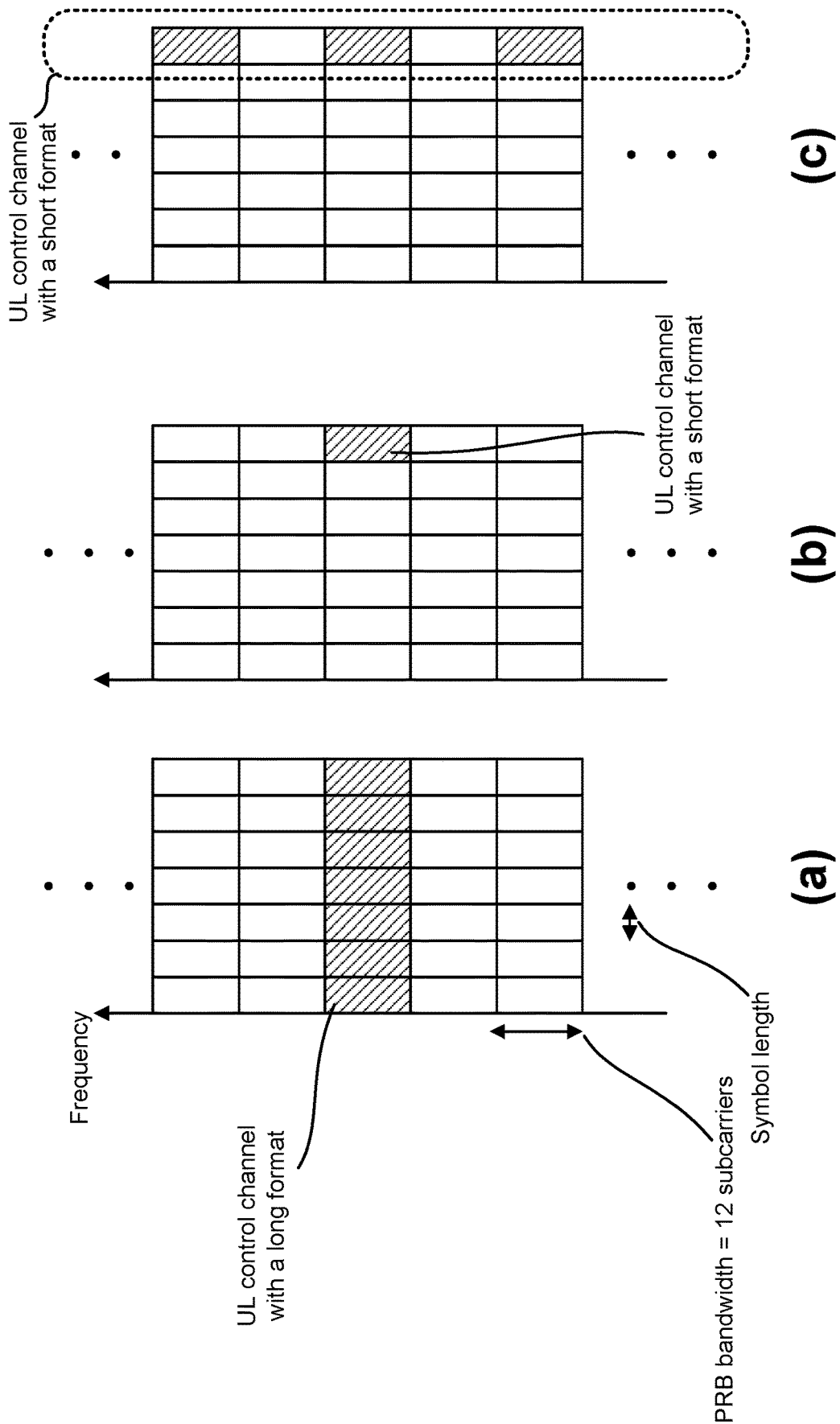
FIG. 10 shows examples of uplink (UL) control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 11:
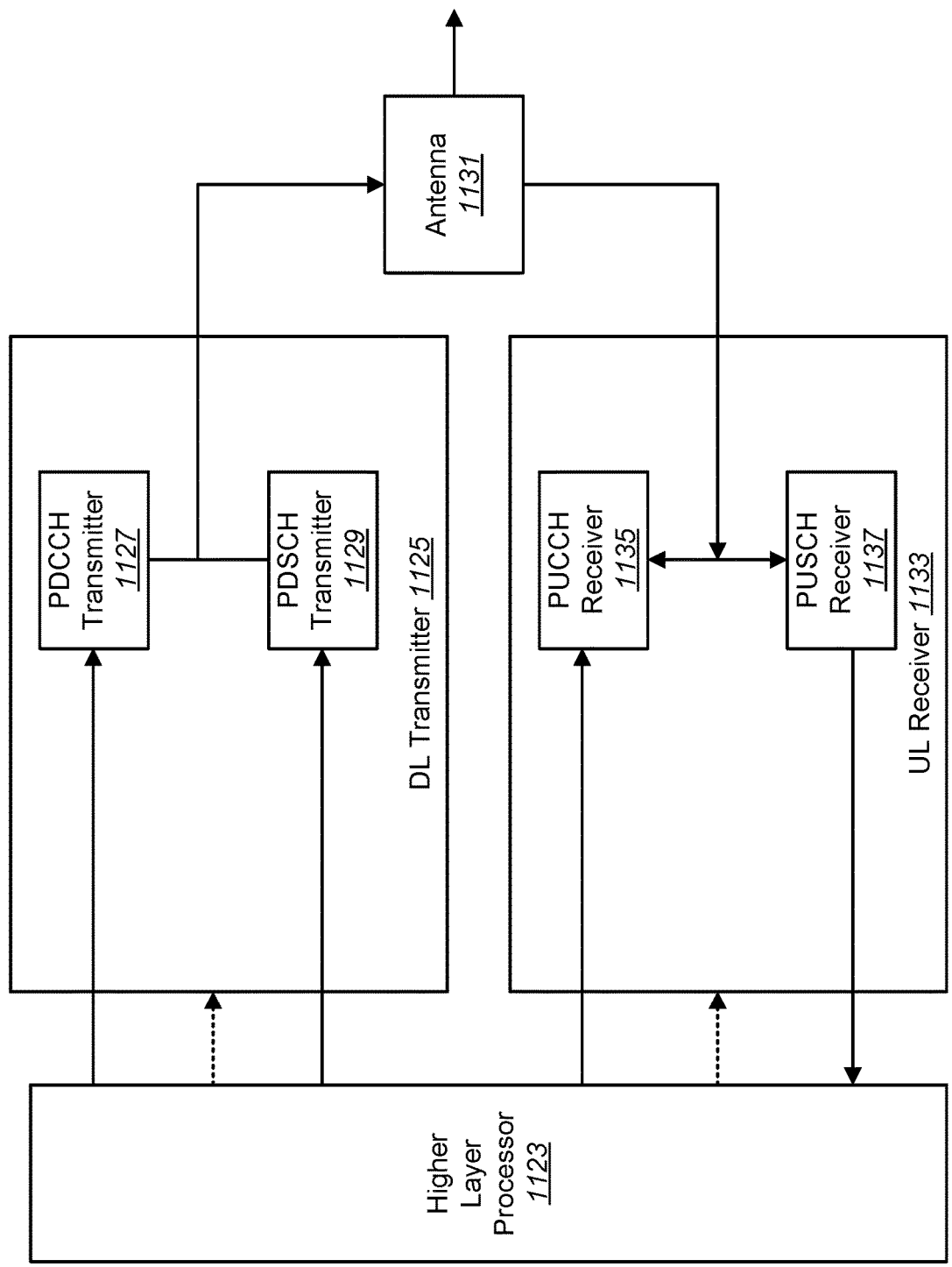
FIG. 11 is a block diagram illustrating one implementation of a gNB.

FIG. 11 is a block diagram illustrating one implementation of an gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
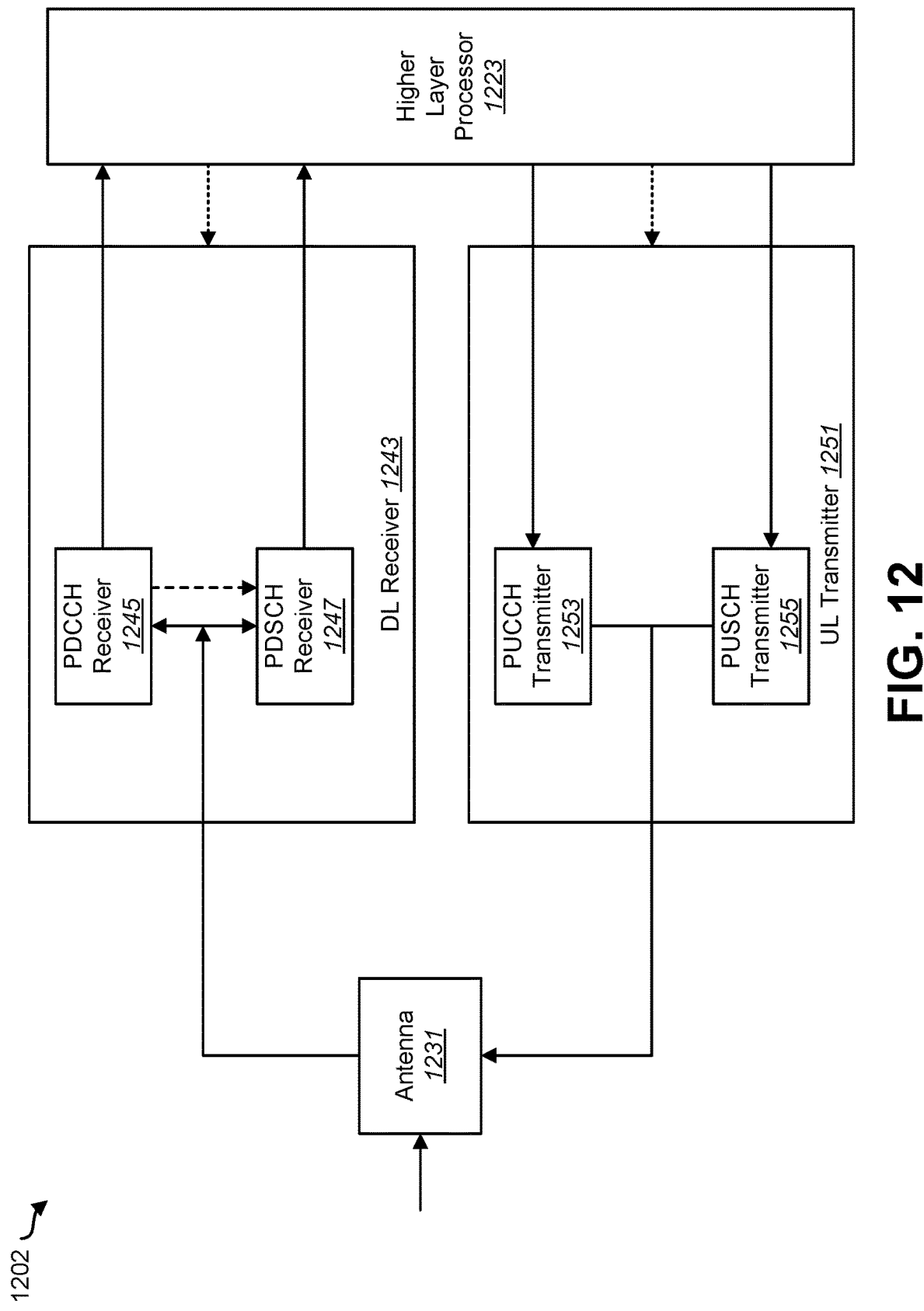
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
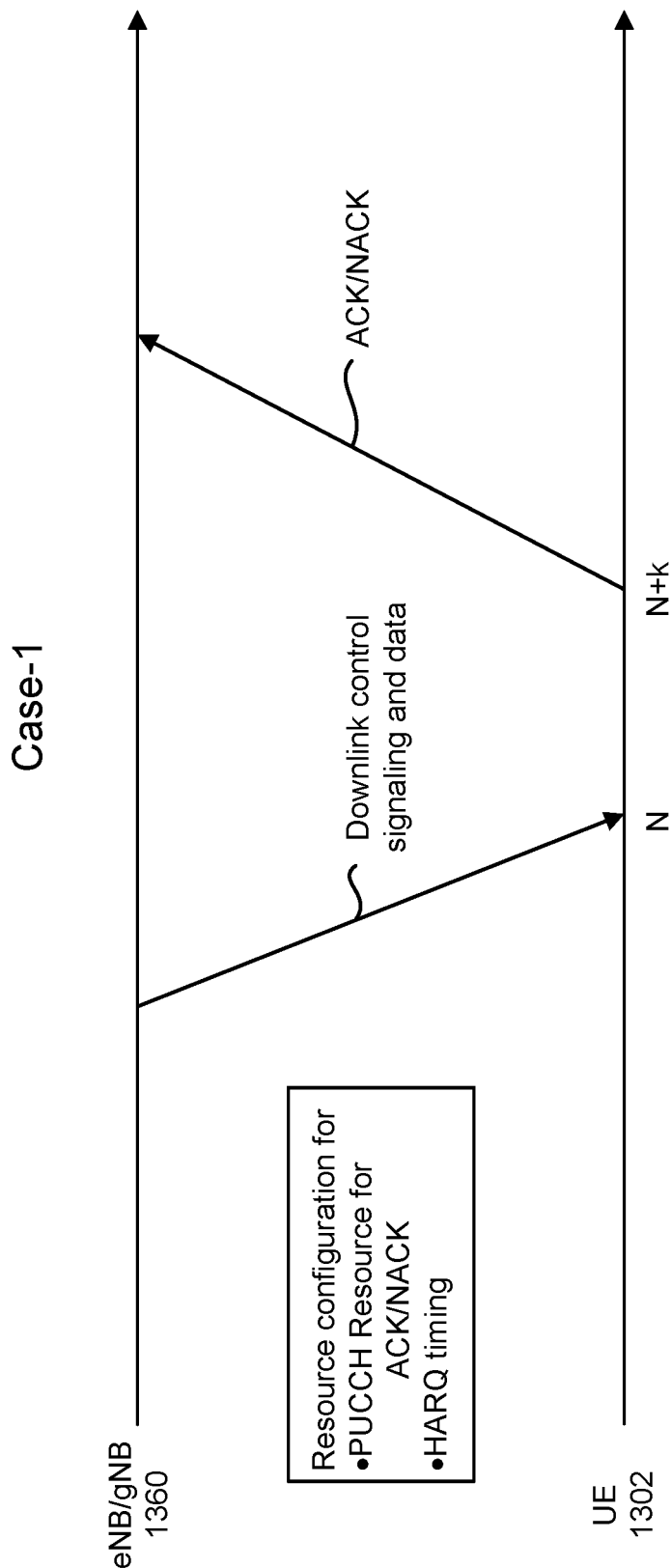
FIG. 13 is an example illustrating a first case (Case-1) for transmission/retransmission design for ultra-reliable and low latency communications.

FIG. 13 is an example illustrating a first case (Case-1) for transmission/retransmission design for ultra-reliable and low latency communications. Case-1 is for a DL transmission with a quick ACK/NACK. A UE 1302 may be in communication with an eNB/gNB 1360. Resources may be configured for a PUCCH resource for ACK/NACK and HARQ timing.

The eNB/gNB 1360 may send downlink control signaling and data. The UE 1302 may receive the downlink control signaling and data in time N. The UE 1302 may respond with ACK/NACK at timing N+k. The choices of k can be preconfigured by the higher layers (e.g. RRC, MAC CE). A multi-bits signaling included in PDCCH can indicate the choice of k. For example, "00" may indicate k=0; "01" may indicate k=2; "10" may indicate k=4; and "11" may indicate k=8. When DL data is transmitted, the multi-bits signaling contained in the front-loaded PDCCH may tell the UE 1302 when to use the PUCCH resource to transmit ACK/NACK.

Figure 14:
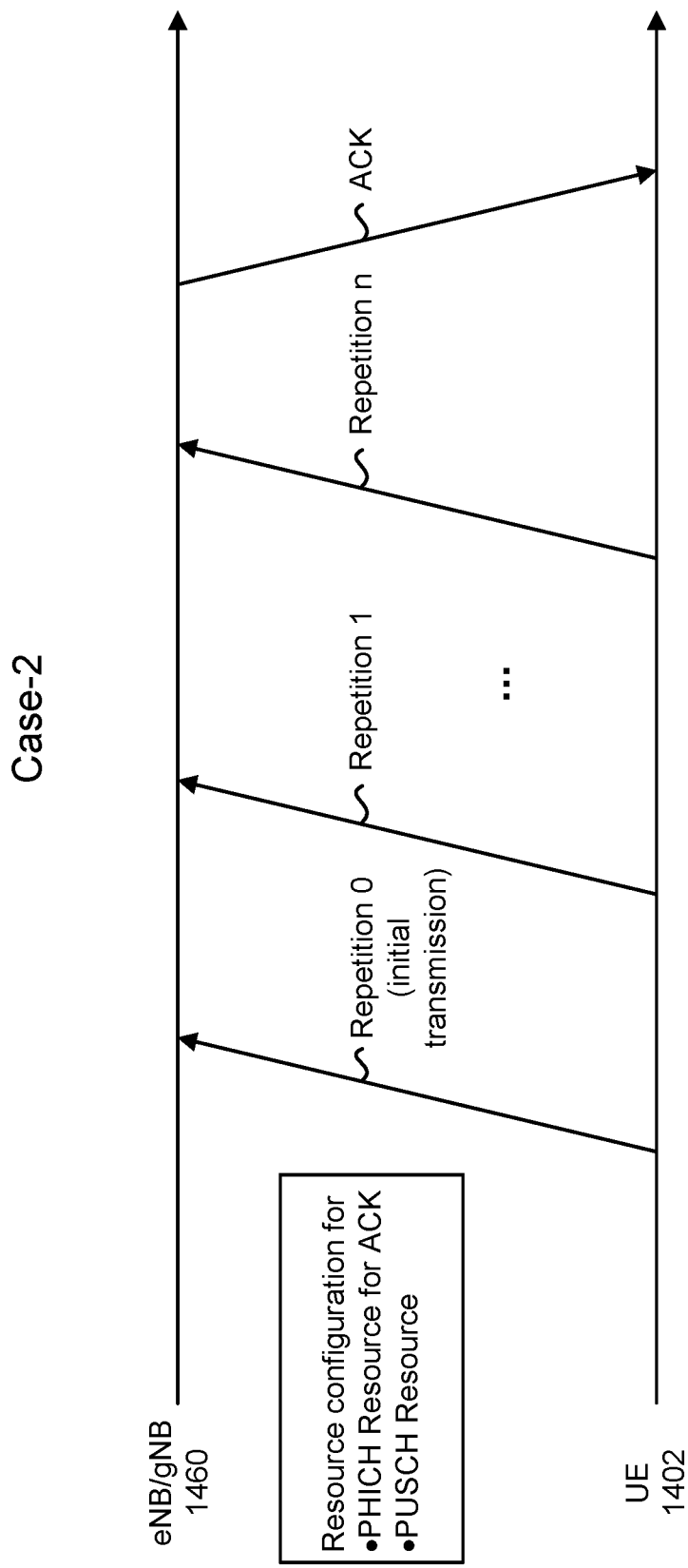
FIG. 14 is an example illustrating a second case (Case-2) for transmission/retransmission design for ultra-reliable and low latency communications.

FIG. 14 is an example illustrating a second case (Case-2) for transmission/retransmission design for ultra-reliable and low latency communications. In Case-2, uplink repetitions may occur until an ACK is received. A UE 1402 may be in communication with an eNB/gNB 1460. Resources may be configured for a PHICH resource for ACK and a PUSCH resource.

The UE 1402 may send the first uplink repetition (i.e., the repetition 0). This may be the initial uplink transmission. The UE 1402 may continue to repeat the uplink transmissions (repetition 1 . . . repetition n) until the UE 1402 receives an ACK from the eNB/gNB 1460.

Figure 15:
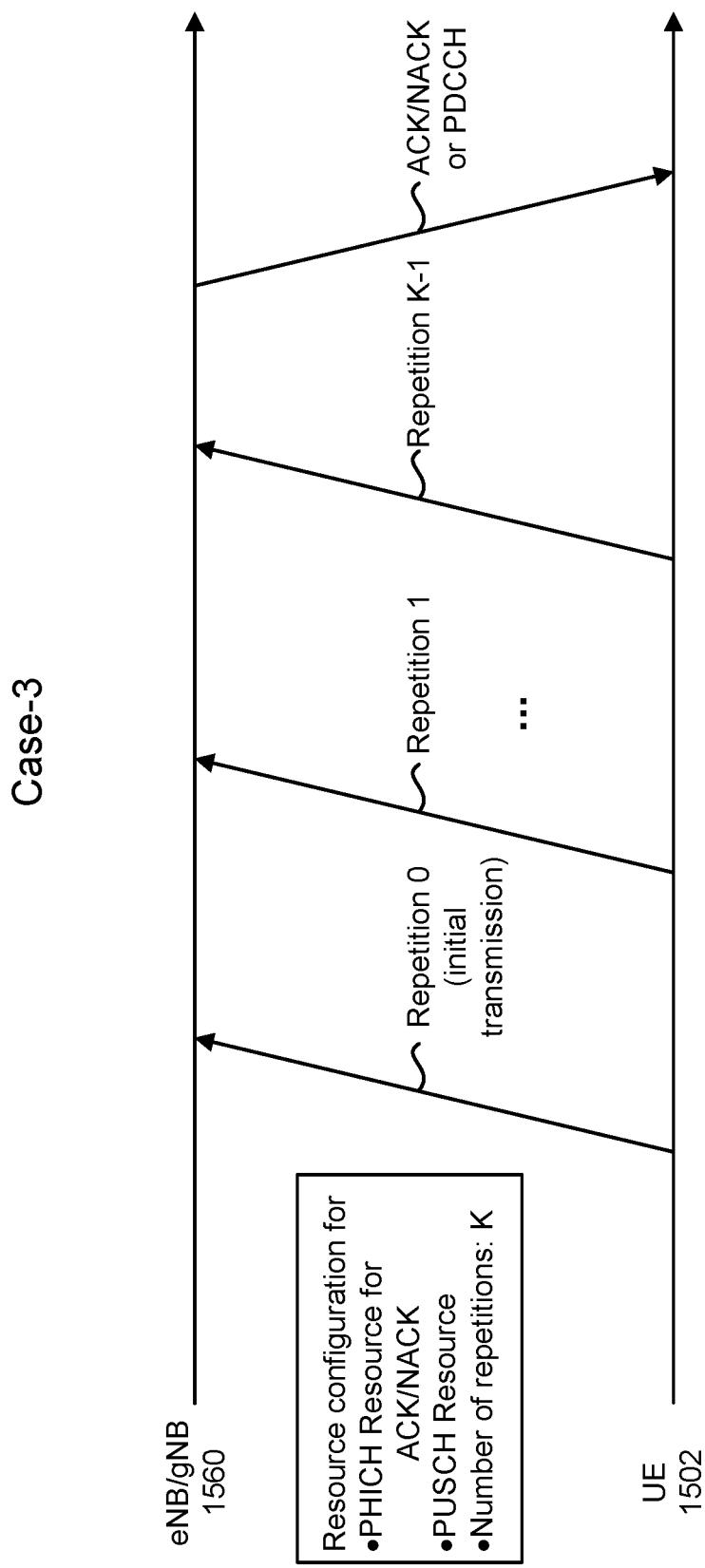
FIG. 15 is an example illustrating a third case (Case-3) for transmission/retransmission design for ultra-reliable and low latency communications.

FIG. 15 is an example illustrating a third case (Case-3) for transmission/retransmission design for ultra-reliable and low latency communications. In Case-3, uplink repetitions may occur with a fixed number K. A UE 1502 may be in communication with an eNB/gNB 1560. Resources may be configured for a PHICH resource for ACK/NACK, a PUSCH resource and a number of repetitions (K).

The UE 1502 may send the first uplink repetition (i.e., the repetition 0). This may be the initial uplink transmission. The UE 1502 may send K−1 additional uplink repetitions (Repetition 1 . . . Repetition K−1). The eNB/gNB 1560 may send an ACK/NACK or a PDCCH.

Figure 16:
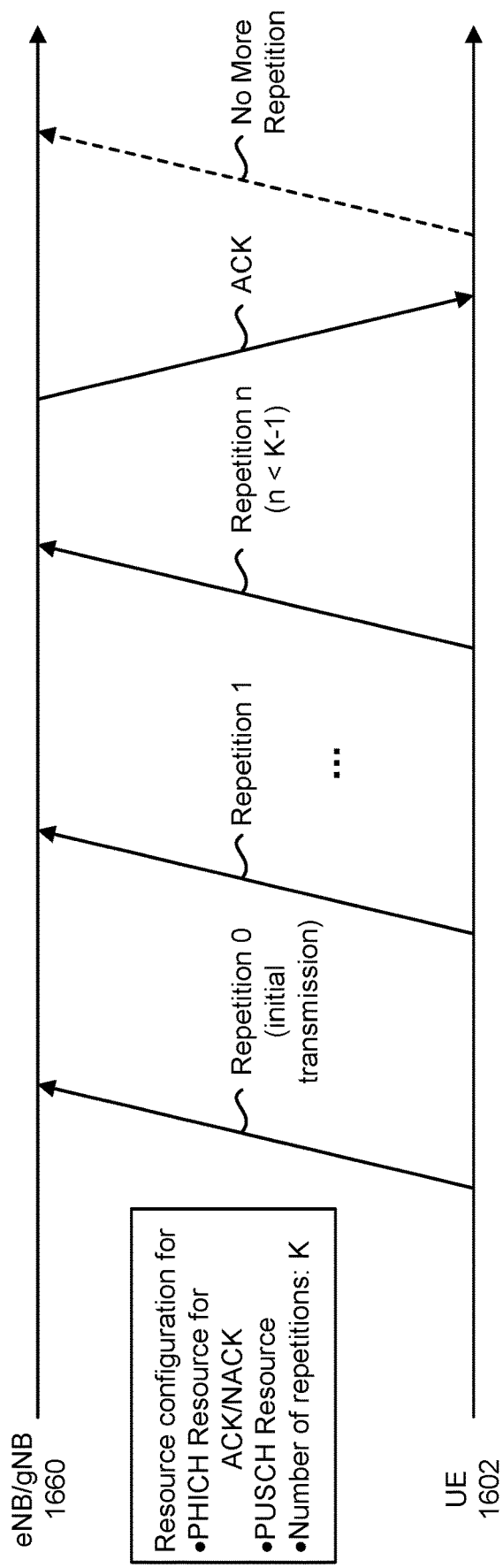
FIG. 16 is an example illustrating a fourth case (Case-4) for transmission/retransmission design for ultra-reliable and low latency communications.

FIG. 16 is an example illustrating a fourth case (Case-4) for transmission/retransmission design for ultra-reliable and low latency communications. In Case-4, uplink repetitions may occur with early termination. A UE 1602 may be in communication with an eNB/gNB 1660. As in Case-3, resources may be configured for a PHICH resource for ACK/NACK, a PUSCH resource and a number of repetitions (K).

The UE 1602 may send the first uplink repetition (i.e., the repetition 0). This may be the initial uplink transmission. The UE 1602 may send a number of additional uplink repetitions. After a certain number of repetitions (Repetition n, where n is less than K−1), the eNB/gNB 1660 may send an ACK. In response to the ACK, the UE 1602 may terminate the uplink repetitions.

FIG. 17 is an example of DL/UL switching in time division duplexing (TDD) for a quick ACK/NACK. A system frame may have an initial subframe configuration 1703 configured as a DL-heavy frame.

A sporadic URLLC DL transmission may occur. This URLLC DL transmission may require a quick ACK/NACK. In this case, a DL subframe can be dynamically switched to UL subframe to carry the ACK/NACK. As illustrated in the subframe reconfiguration 1705, a PDCCH may trigger a dynamic switch from DL to UL for a quick ACK/NACK. The DL data may be sent in a PDSCH, followed by a second DL subframe. The ACK/NACK may occur in a PUCCH of the subframe that is switched from DL to UL.

Figure 18:
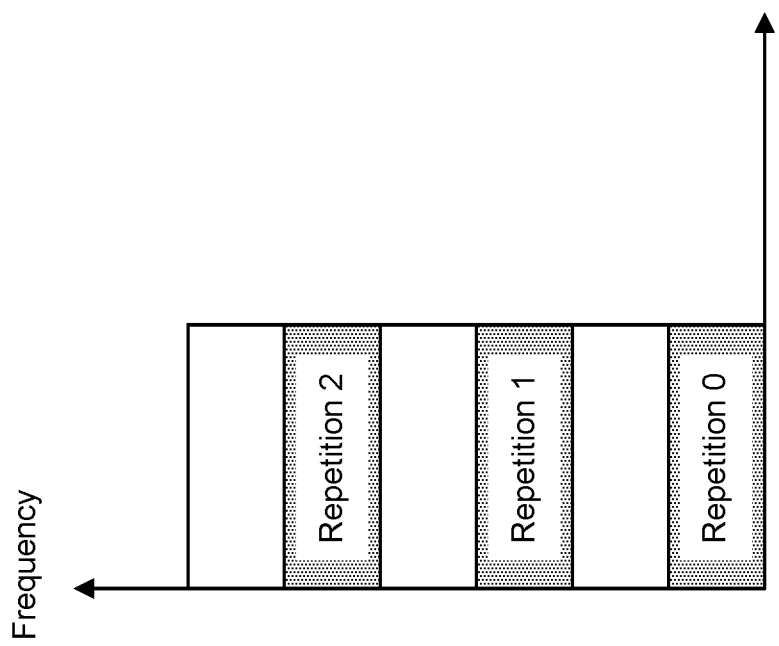
FIG. 18 is an example illustrating repetitions in the frequency domain.

FIG. 18 is an example illustrating repetitions in the frequency domain. In this approach, transmission of the same TB can repeat in the frequency domain. For example, repetition 0 may occur at a first frequency, repetition 1 may occur at a second frequency, repetition 2 may occur at a third frequency, and so forth.

Figure 19:
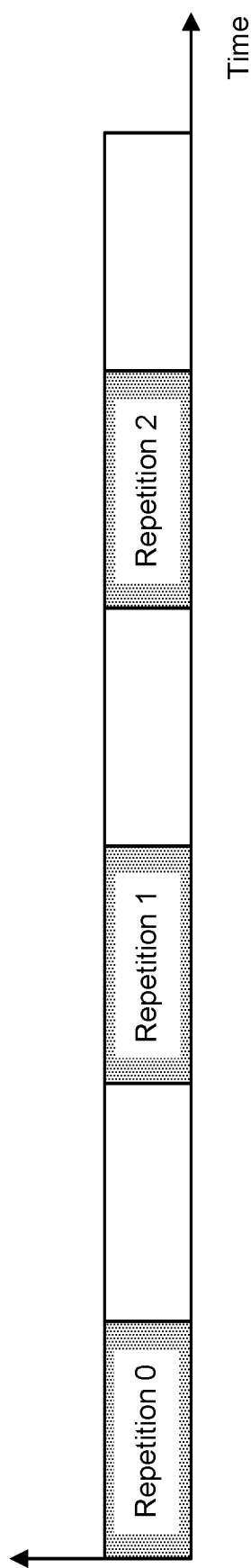
FIG. 19 is an example illustrating repetitions in the time domain.

FIG. 19 is an example illustrating repetitions in the time domain. In this approach, transmission of the same TB can repeat in the time domain. For example, repetition 0 may occur at a first time, repetition 1 may occur at a second time, repetition 2 may occur at a third time, and so forth.

Figure 20:
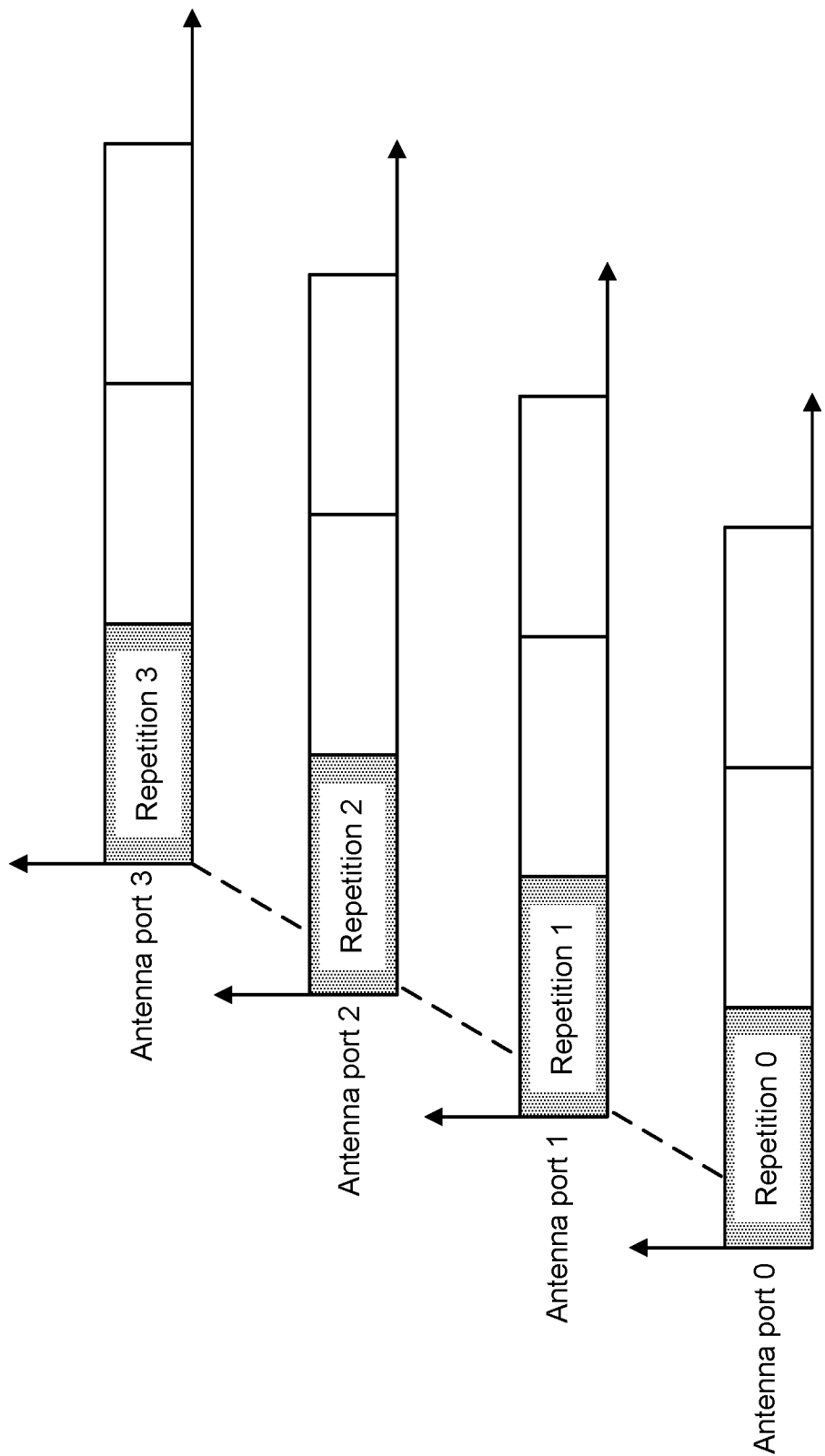
FIG. 20 is an example illustrating repetitions in the spatial domain.

FIG. 20 is an example illustrating repetitions in the spatial domain. In this approach, transmission of the same TB can repeat in the spatial domain. For example, repetition 0 may occur at antenna port 0, repetition 1 may occur at antenna port 1, repetition 2 may occur at antenna port 2, repetition 2 may occur at antenna port 3, and so forth.

FIG. 21 is an example illustrating repetitions using a combination of time/frequency resource. The repetitions may occur on different frequencies and/or at different times. In this example, there are two repetition patterns (i.e., pattern a and pattern b).

Figure 22:
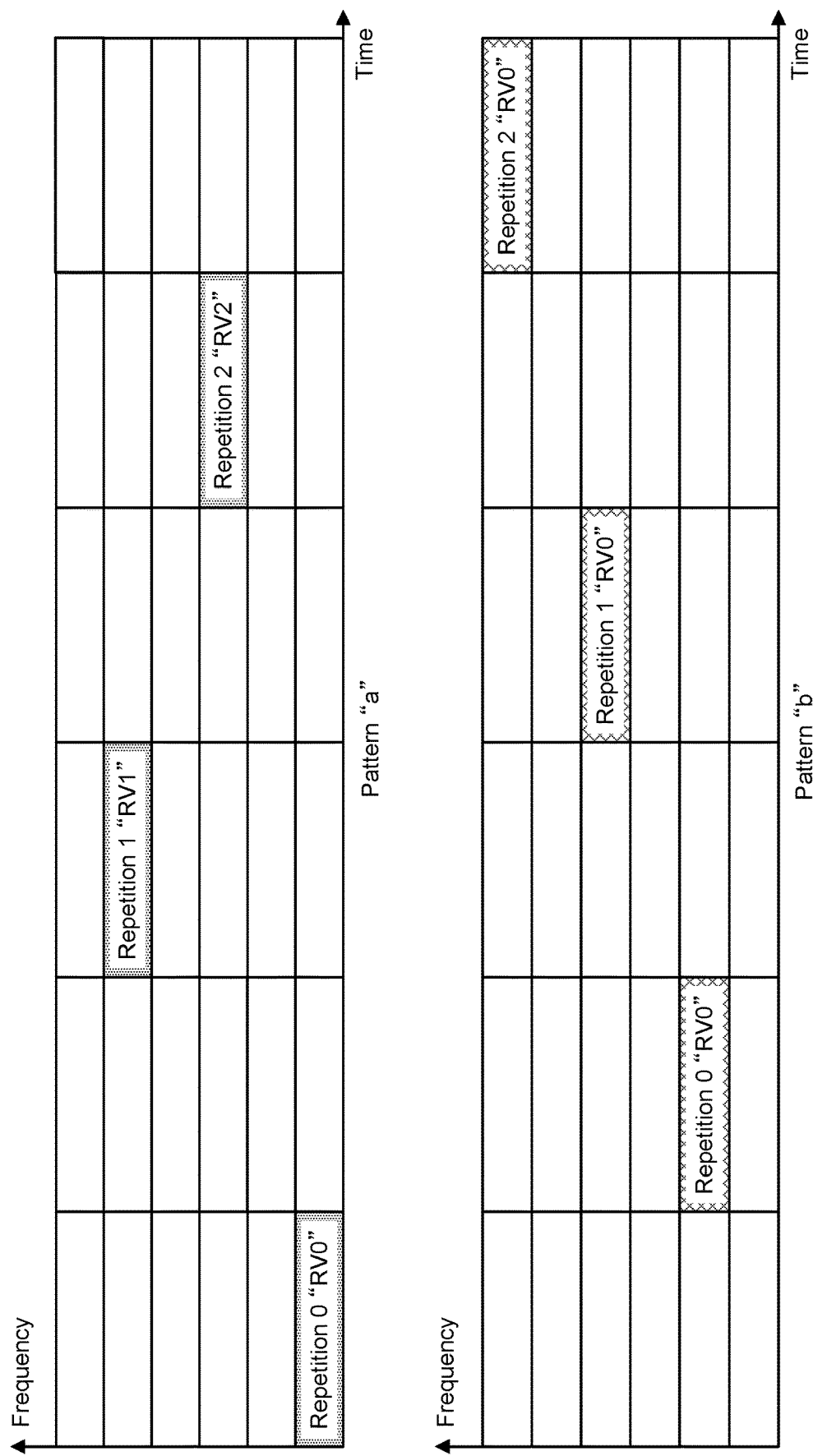
FIG. 22 is an example illustrating a repetition pattern with different redundancy versions (RVs) and a repetition pattern with the same RV.

FIG. 22 is an example illustrating the repetition pattern with different redundancy versions (RVs) and the repetition pattern with the same RV. The repetitions in this example use a combination of time/frequency resource. The repetitions may occur on different frequencies and/or at different times.

In this example, there are two repetition patterns (i.e., a pattern "a" and a pattern "b"). The pattern "a" uses different RVs while the pattern "b" uses the same RV. Specifically, the pattern "a" uses "RV 0", "RV 1" and "RV 2". And, the pattern "b" uses "RV 0".

It should be noted that when the different RVs are used for the repetitions, there are some approaches to determine the RV of each repetition. In a first approach, the RV index can be implicitly indicated by the resource location if the repetition pattern is predefined and the RV index is fixed at corresponding resource location. In a second approach, the RV index can be implicitly indicated by the repetition index according to a predefined mapping. In a third approach, the RV can be dynamically selected for each repetition and explicitly indicated.

Figure 23:
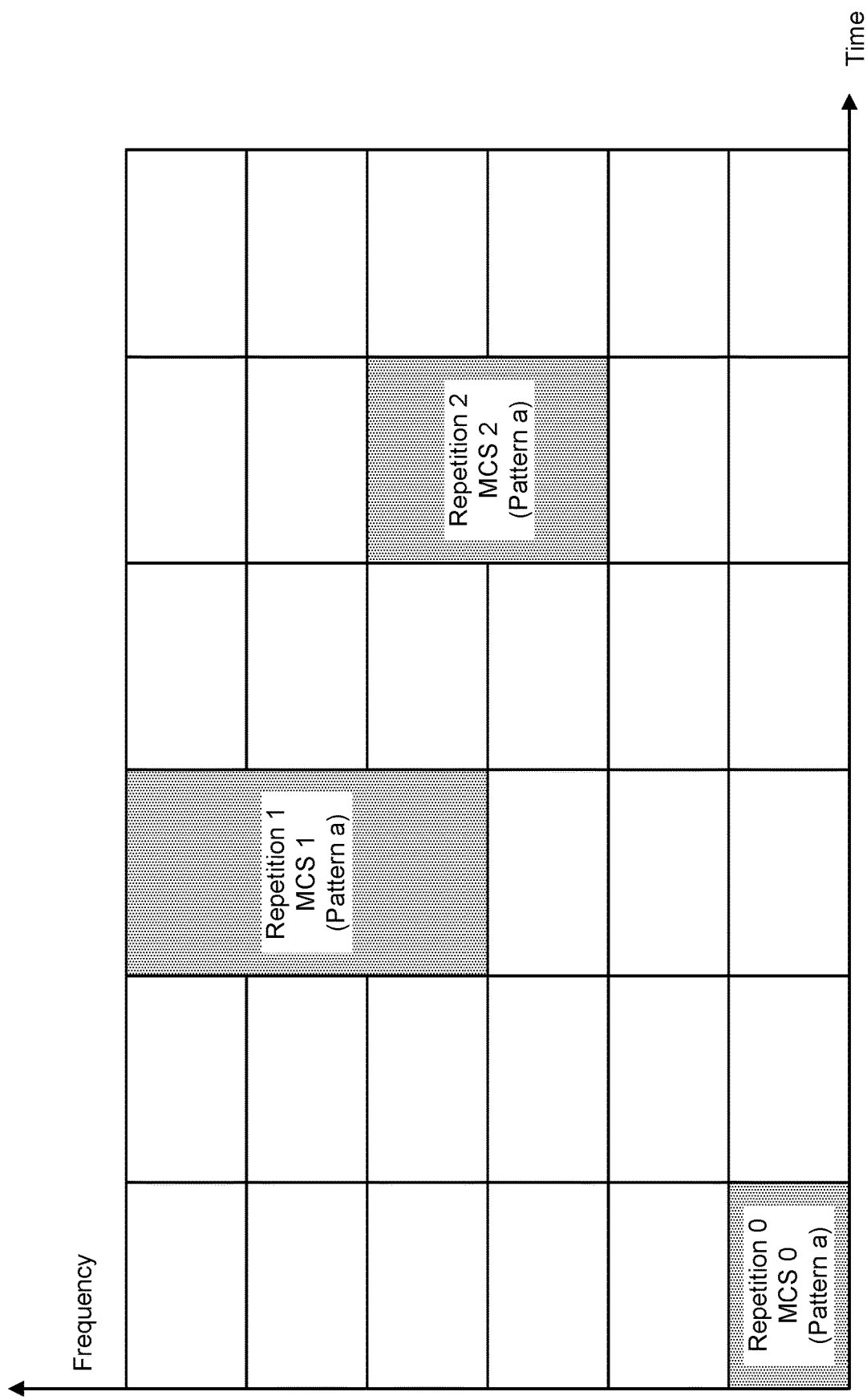
FIG. 23 is an example illustrating repetitions using different modulation and coding schemes (MCSs)

FIG. 23 is an example illustrating repetitions using different modulation and coding schemes (MCSs). In this case, each repetition may use a different MCS for the same TB.

In this example the repetitions follow the same pattern (i.e., Pattern a). Repetition 0 uses MCS 0. Repetition 1 uses MCS 1. Repetition 2 uses MCS 2.

When different MCSs are used for repetitions, there are some approaches to determine the MCS of each repetition. In a first approach, the MCS index can be implicitly indicated by the resource location if the repetition pattern is predefined and RV index is fixed at corresponding resource location. In a second approach, the MCS index can be implicitly indicated by the repetition index according to a predefined mapping. In a third approach, the MCS can be dynamically selected for each repetition and explicitly indicated.

Figure 24:
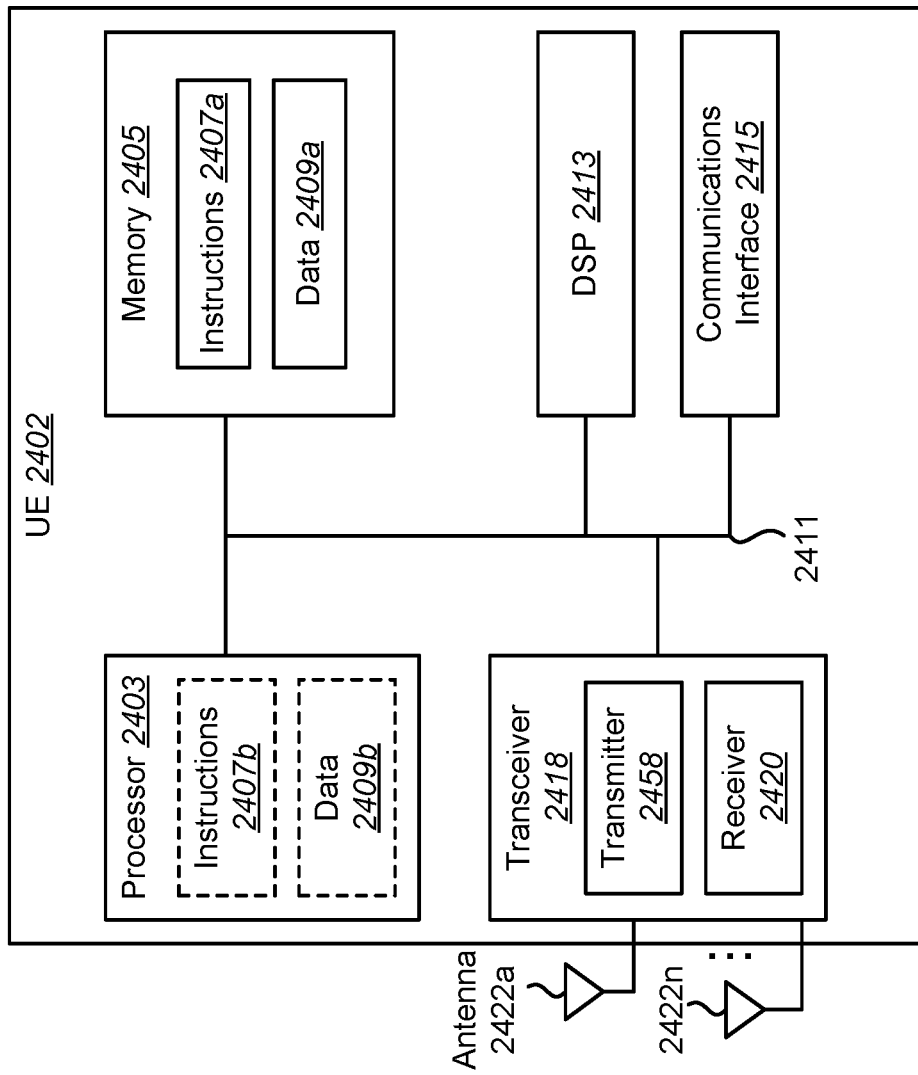
FIG. 24 illustrates various components that may be utilized in a UE.

FIG. 24 illustrates various components that may be utilized in a UE 2402. The UE 2402 described in connection with FIG. 24 may be implemented in accordance with the UE 102 described in connection with FIG. 1. The UE 2402 includes a processor 2403 that controls operation of the UE 2402. The processor 2403 may also be referred to as a central processing unit (CPU). Memory 2405, which may include read-only memory (ROM), random access memory (RAM), a combination of the two or any type of device that may store information, provides instructions 2407a and data 2409a to the processor 2403. A portion of the memory 2405 may also include non-volatile random access memory (NVRAM). Instructions 2407b and data 2409b may also reside in the processor 2403. Instructions 2407b and/or data 2409b loaded into the processor 2403 may also include instructions 2407a and/or data 2409a from memory 2405 that were loaded for execution or processing by the processor 2403. The instructions 2407b may be executed by the processor 2403 to implement the methods described above.

The UE 2402 may also include a housing that contains one or more transmitters 2458 and one or more receivers 2420 to allow transmission and reception of data. The transmitter(s) 2458 and receiver(s) 2420 may be combined into one or more transceivers 2418. One or more antennas 2422a-n are attached to the housing and electrically coupled to the transceiver 2418.

The various components of the UE 2402 are coupled together by a bus system 2411, which may include a power bus, a control signal bus and a status signal bus, in addition to a data bus. However, for the sake of clarity, the various buses are illustrated in FIG. 24 as the bus system 2411. The UE 2402 may also include a digital signal processor (DSP) 2413 for use in processing signals. The UE 2402 may also include a communications interface 2415 that provides user access to the functions of the UE 2402. The UE 2402 illustrated in FIG. 24 is a functional block diagram rather than a listing of specific components.

Figure 25:
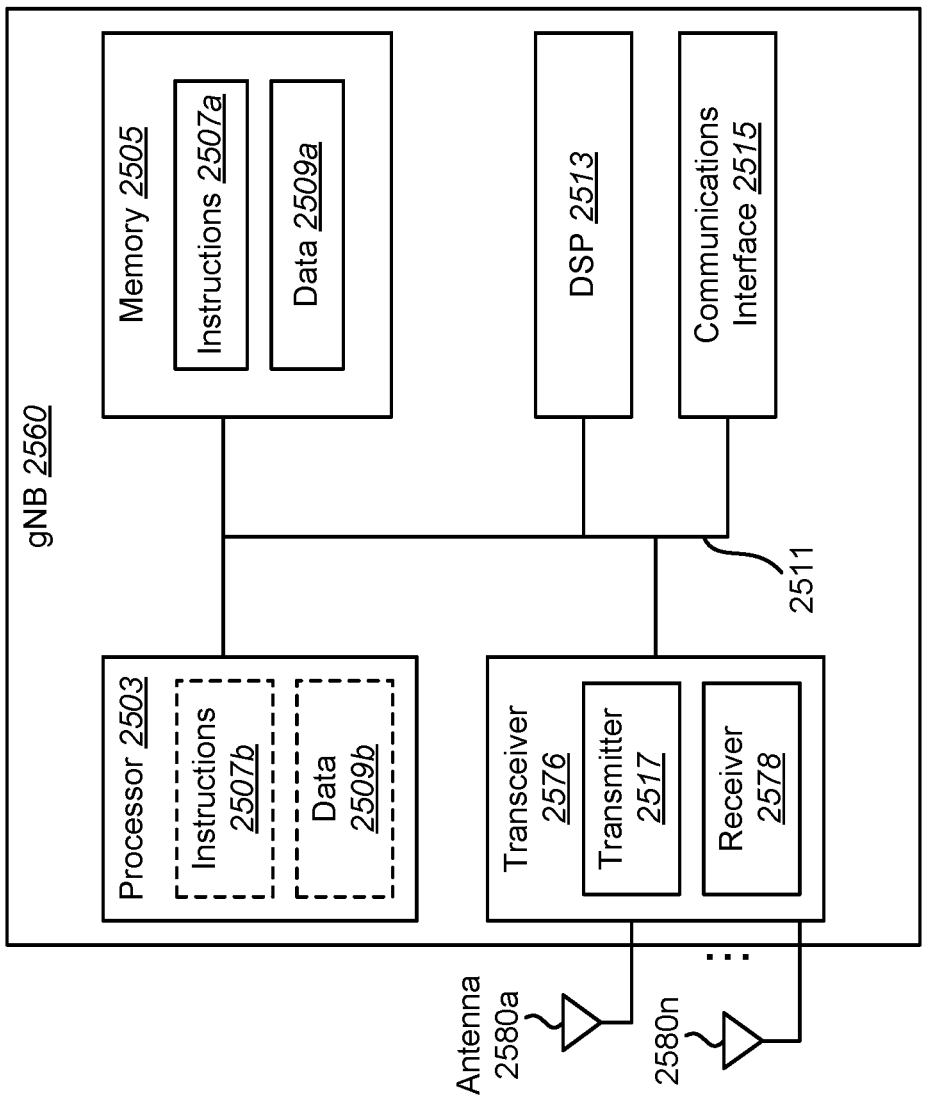
FIG. 25 illustrates various components that may be utilized in a gNB.

FIG. 25 illustrates various components that may be utilized in a gNB 2560. The gNB 2560 described in connection with FIG. 25 may be implemented in accordance with the gNB 160 described in connection with FIG. 1. The gNB 2560 includes a processor 2503 that controls operation of the gNB 2560. The processor 2503 may also be referred to as a central processing unit (CPU). Memory 2505, which may include read-only memory (ROM), random access memory (RAM), a combination of the two or any type of device that may store information, provides instructions 2507a and data 2509a to the processor 2503. A portion of the memory 2505 may also include non-volatile random access memory (NVRAM). Instructions 2507b and data 2509b may also reside in the processor 2503. Instructions 2507b and/or data 2509b loaded into the processor 2503 may also include instructions 2507a and/or data 2509a from memory 2505 that were loaded for execution or processing by the processor 2503. The instructions 2507b may be executed by the processor 2503 to implement the methods described above.

The gNB 2560 may also include a housing that contains one or more transmitters 2517 and one or more receivers 2578 to allow transmission and reception of data. The transmitter(s) 2517 and receiver(s) 2578 may be combined into one or more transceivers 2576. One or more antennas 2580a-n are attached to the housing and electrically coupled to the transceiver 2576.

The various components of the gNB 2560 are coupled together by a bus system 2511, which may include a power bus, a control signal bus and a status signal bus, in addition to a data bus. However, for the sake of clarity, the various buses are illustrated in FIG. 25 as the bus system 2511. The gNB 2560 may also include a digital signal processor (DSP) 2513 for use in processing signals. The gNB 2560 may also include a communications interface 2515 that provides user access to the functions of the gNB 2560. The gNB 2560 illustrated in FIG. 25 is a functional block diagram rather than a listing of specific components.

Figure 26:
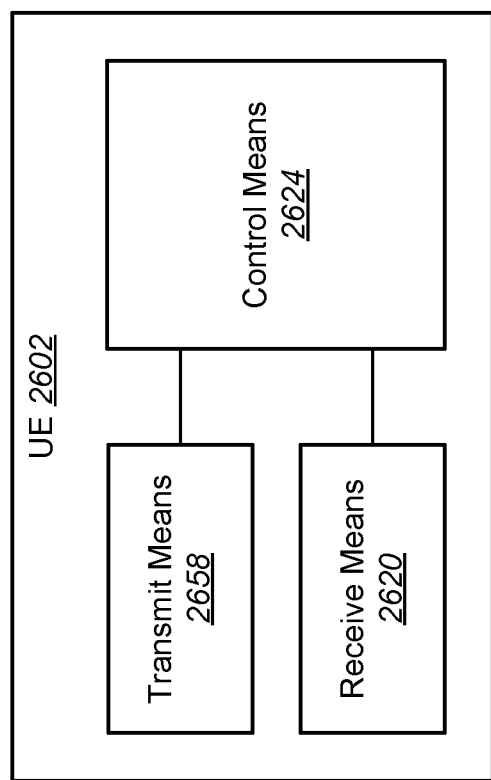
FIG. 26 is a block diagram illustrating one implementation of a UE in which systems and methods for ultra-reliable and low latency communication operations may be implemented.

FIG. 26 is a block diagram illustrating one implementation of a UE 2602 in which systems and methods for ultra-reliable and low latency communication operations may be implemented. The UE 2602 includes transmit means 2658, receive means 2620 and control means 2624. The transmit means 2658, receive means 2620 and control means 2624 may be configured to perform one or more of the functions described in connection with FIG. 1 above. FIG. 24 above illustrates one example of a concrete apparatus structure of FIG. 26. Other various structures may be implemented to realize one or more of the functions of FIG. 1. For example, a DSP may be realized by software.

Figure 27:
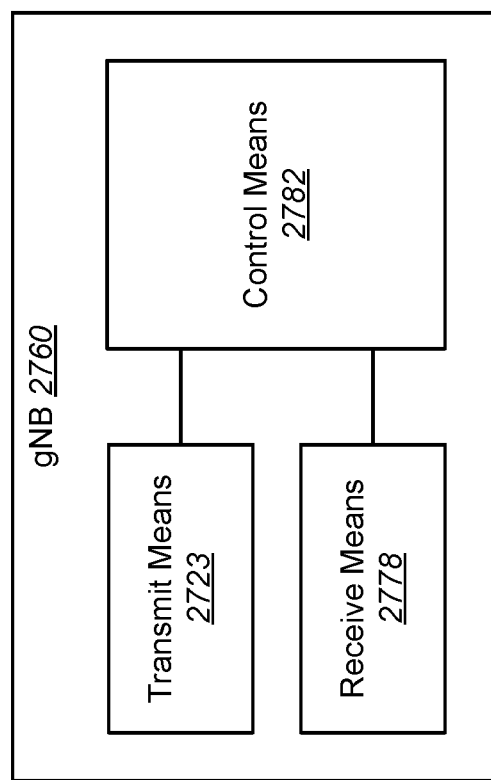
FIG. 27 is a block diagram illustrating one implementation of a gNB in which systems and methods for ultra-reliable and low latency communication operations may be implemented.

FIG. 27 is a block diagram illustrating one implementation of a gNB 2760 in which systems and methods for ultra-reliable and low latency communication operations may be implemented. The gNB 2760 includes transmit means 2717, receive means 2778 and control means 2782. The transmit means 2717, receive means 2778 and control means 2782 may be configured to perform one or more of the functions described in connection with FIG. 1 above. FIG. 25 above illustrates one example of a concrete apparatus structure of FIG. 27. Other various structures may be implemented to realize one or more of the functions of FIG. 1. For example, a DSP may be realized by software.

Figure 28:
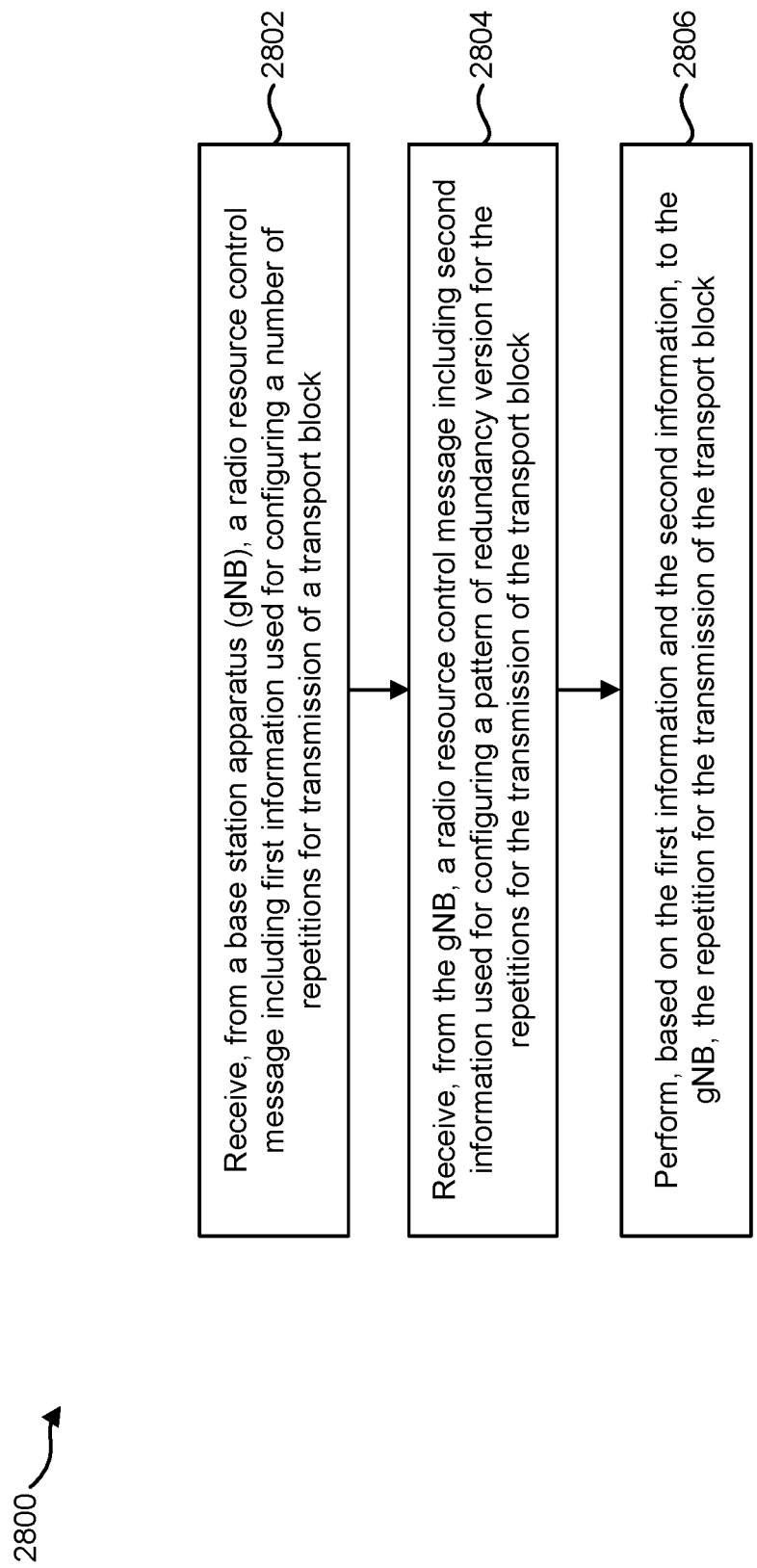
FIG. 28 is a flow diagram illustrating a communication method of a UE.

FIG. 28 is a flow diagram illustrating a communication method 2800 of a user equipment (UE) 102. The UE 102 may receive 2802, from a base station apparatus (gNB) 160, a radio resource control message including first information used for configuring a number of repetitions for transmission of a transport block.

The UE 102 may receive 2804, from the base station apparatus (gNB) 160, a radio resource control message including second information used for configuring a pattern of redundancy version for the repetitions for the transmission of the transport block. The pattern of the redundancy version may be any one of a first pattern and a second pattern. The first pattern may be that different redundancy versions are used the repetitions for the transmission of the transport block. The second pattern may be that a same redundancy version is used the repetitions for the transmission of the transport block.

The UE 102 may perform 2806, based on the first information and the second information, to the base station apparatus (gNB) 160, the repetition for the transmission of the transport block. The same redundancy version used for the repetitions for the transmission for the transport block may be a redundancy version "zero."

In some implementations, an initial transmission of the repetitions for the transmission for the transport block may be started at any position of resource. In some implementations, the initial transmission of the repetitions for the transmission for the transport block may be started at a specific position of resource.

Figure 29:
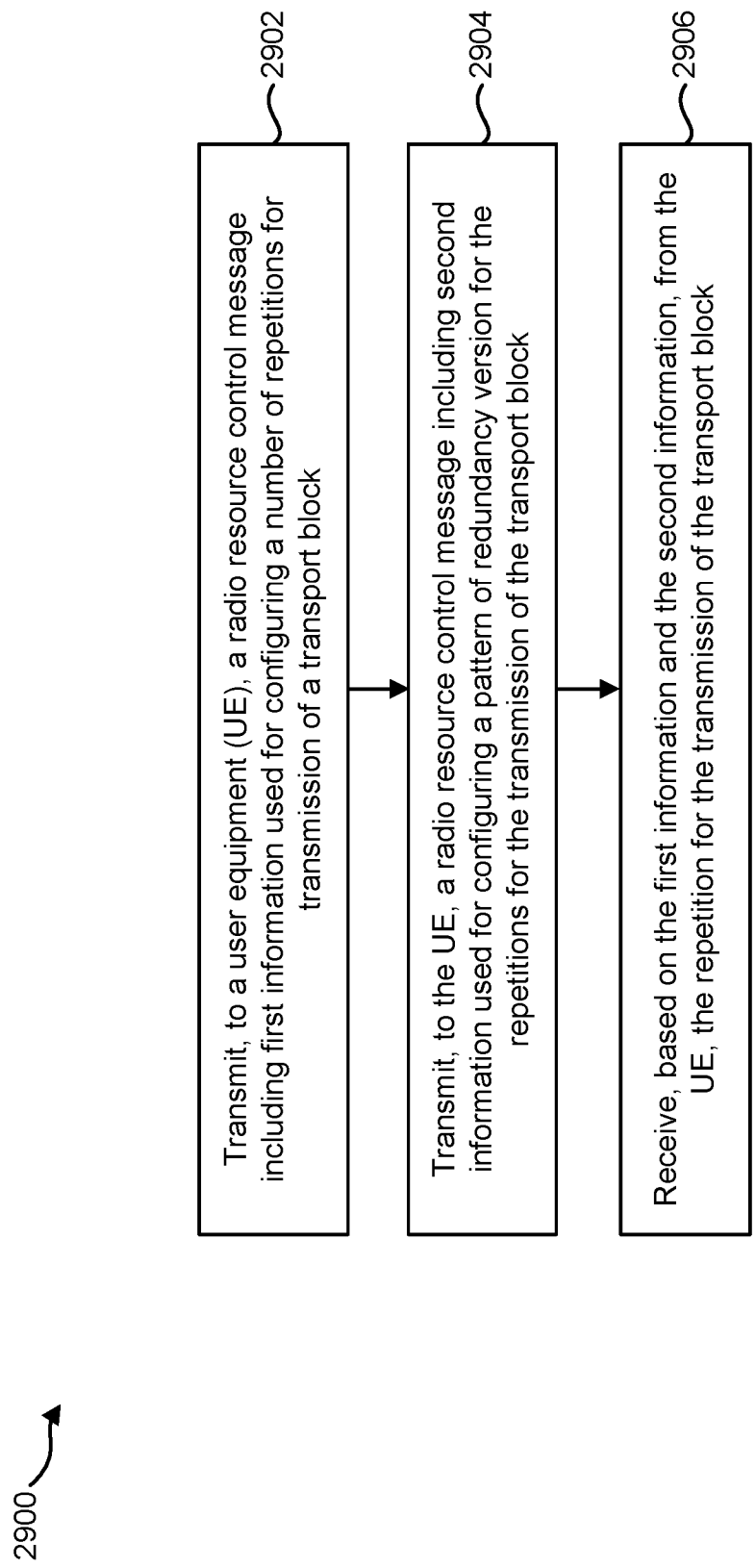
FIG. 29 is a flow diagram illustrating a communication method of a gNB.

FIG. 29 is a flow diagram illustrating a communication method 2900 of a base station apparatus (gNB) 160. The gNB 160 may transmit 2902, to a user equipment (UE) 102, a radio resource control message including first information used for configuring a number of repetitions for transmission of a transport block.

The gNB 160 may transmit 2904, to the UE 102, a radio resource control message including second information used for configuring a pattern of redundancy version for the repetitions for the transmission of the transport block. The pattern of the redundancy version may be any one of a first pattern and a second pattern. The first pattern may be that different redundancy versions are used the repetitions for the transmission of the transport block. The second pattern may be that a same redundancy version is used the repetitions for the transmission of the transport block.

The gNB 160 may receive 2906, based on the first information and the second information, from the UE 102, the repetition for the transmission of the transport block. The same redundancy version used for the repetitions for the transmission for the transport block may be a redundancy version "zero."

In some implementations, an initial transmission of the repetitions for the transmission for the transport block may be started at any position of resource. In some implementations, the initial transmission of the repetitions for the transmission for the transport block may be started at a specific position of resource.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment that communicates with a base station apparatus comprising:
receiving circuitry configured to receive a radio resource control message including first information, second information and third information, the first information indicating any one of 1, 2, 4, and 8 as a number of repetitions for uplink transmissions of a transport block, the second information being used for configuring a pattern of redundancy versions for repetitions for the uplink transmissions of the transport block, the third information being used for configuring a periodicity for the repetitions for the uplink transmissions of the transport block;
the receiving circuitry configured to receive a radio resource control message comprising fourth information used for configuring a numerology among multiple numerologies;
the receiving circuitry being configured to receive, on a physical downlink control channel (PDCCH), downlink control information (DCI) with cyclic redundancy check (CRC) scrambled by a first radio network identifier (RNTI) different from a Cell-RNTI (C-RNTI) and a semi-persistent C-RNTI (SPS C-RNTI) indicating an activation of the repetitions of the uplink transmissions of the transport block; and
transmitting circuitry configured to perform, based on a detection of the DCI, the repetitions for the uplink transmissions of the transport block according to the first information and the second information and the third information and the fourth information, wherein
the pattern of the redundancy versions is from a set of patterns of redundancy versions, the set of patterns of redundancy versions comprising at least a first pattern and a second pattern,
the first pattern being that different redundancy versions are used for the repetitions for the uplink transmissions of the transport block,
the second pattern being that a same redundancy version are used for the repetitions for the uplink transmissions of the transport block, and
the same redundancy version used for the repetitions for the uplink transmissions of the transport block is a redundancy version "zero" in sequence.

2. The user equipment of claim 1, wherein
an initial transmission of the repetitions for the uplink transmissions of the transport block is started at any position of resource.

3. The user equipment of claim 1, wherein
an initial transmission of the repetitions for the uplink transmissions of the transport block is started at a specific position of resource.

4. A base station apparatus that communicates with a user equipment comprising:
transmitting circuitry configured to transmit a radio resource control message including first information, second information and third information, the first information indicating any one of 1, 2, 4, and 8 as a number of repetitions for uplink transmissions of a transport block, the second information being used for configuring a pattern of redundancy versions for the repetitions for the uplink transmissions of the transport block, the third information being used for configuring a periodicity for the repetitions for the uplink transmissions of the transport block;
the transmitting circuitry configured to transmit a radio resource control message comprising fourth information used for configuring a numerology among multiple numerologies;
the transmitting circuitry being configured to transmit, on a physical downlink control channel (PDCCH), downlink control information (DCI) with cyclic redundancy check (CRC) scrambled by a first radio network identifier (RNTI) different from a Cell-RNTI (C-RNTI) and a semi-persistent C-RNTI (SPS C-RNTI) indicating an activation of the repetitions of the uplink transmissions of the transport block; and receiving circuitry configured to receive, based on a detection of the DCI, the repetitions for the uplink transmissions of the transport block according to the first information and the second information and the third information and the fourth information, wherein the pattern of the redundancy versions is from a set of patterns of redundancy versions, the set of patterns of redundancy versions comprising at least a first pattern and a second pattern, the first pattern being that different redundancy versions are used for the repetitions for the uplink transmissions of the transport block, the second pattern being that a same redundancy version is used for the repetitions for the uplink transmissions of the transport block, and the same redundancy version used for the repetitions for the uplink transmissions of the transport block is a redundancy version "zero" in sequence.

5. The base station apparatus of claim 4, wherein an initial transmission of the repetitions for the uplink transmissions of the transport block is started at any position of resource.

6. The base station apparatus of claim 4, wherein an initial transmission of the repetitions for the uplink transmissions of the transport block is started at a specific position of resource.

7. A communication method of a user equipment that communicates with a base station apparatus comprising:

receiving a radio resource control message including first information, second information and third information, the first information indicating any one of 1, 2, 4, and 8 as a number of repetitions for uplink transmissions of a transport block, the second information being used for configuring a pattern of redundancy versions for the repetitions for the uplink transmissions of the transport block, the third information being used for configuring a periodicity for the repetitions for the uplink transmissions of the transport block;

receiving a radio resource control message comprising fourth information used for configuring a numerology among multiple numerologies;

receiving, on a physical downlink control channel (PDCCH), downlink control information (DCI) with cyclic redundancy check (CRC) scrambled by a first radio network identifier (RNTI) different from a Cell-RNTI (C-RNTI) and a semi-persistent C-RNTI (SPS C-RNTI) indicating an activation of the repetitions of the uplink transmissions of the transport block; and performing, based on a detection of the DCI, the repetitions of the uplink transmissions of the transport block according to the first information and the second information and the third information and the fourth information, wherein the pattern of the redundancy versions is from a set of patterns of redundancy versions comprising at least a first pattern and a second pattern, the first pattern being that different redundancy versions are used for the repetitions for the uplink transmissions of the transport block, the second pattern being that a same redundancy version is used for the repetitions for the uplink transmissions of the transport block, and the same redundancy version used for the repetitions for the uplink transmissions of the transport block is a redundancy version "zero" in sequence.

8. The communication method of claim 7, wherein an initial transmission of the repetitions for the uplink transmissions of the transport block is started at any position of resource.

9. The communication method of claim 7, wherein an initial transmission of the repetitions for the uplink transmissions of the transport block is started at a specific position of resource.

10. A communication method of a base station apparatus that communicates with a user equipment comprising:

transmitting a radio resource control message including first information, second information and third information, the first information indicating any one of 1, 2, 4, and 8 as a number of repetitions for uplink transmissions of a transport block, the second information being used for configuring a pattern of redundancy versions for the repetitions for the uplink transmissions of the transport block, the third information being used for configuring a periodicity for the repetitions for the uplink transmissions of the transport block;

transmitting a radio resource control message comprising fourth information used for configuring a numerology among multiple numerologies;

transmitting, on a physical downlink control channel (PDCCH), downlink control information (DCI) with cyclic redundancy check (CRC) scrambled by a first radio network identifier (RNTI) different from a Cell-RNTI (C-RNTI) and a semi-persistent C-RNTI (SPS C-RNTI) indicating an activation of the repetitions of the uplink transmissions of the transport block; and receiving, based on a detection of the DCI, the repetitions of the uplink transmissions of the transport block according to the first information and the second information and the third information and the fourth information, wherein the pattern of the redundancy versions is from a set of patterns of redundancy versions, the set of patterns of redundancy versions comprising a first pattern and a second pattern, the first pattern being that different redundancy versions are used for the repetitions for the uplink transmissions of the transport block, the second pattern being that a same redundancy version is used for the repetitions for the uplink transmissions of the transport block, and the same redundancy version used for the repetitions for the uplink transmissions of the transport block is a redundancy version "zero" in sequence.

11. The communication method of claim 10, wherein an initial transmission of the repetitions for the uplink transmissions of the transport block is started at any position of resource.

12. The communication method of claim 10, wherein an initial transmission of the repetitions for the uplink transmissions of the transport block is started at a specific position of resource.

* * * * *